US012180849B1

(12) United States Patent
Jaiswal et al.

(10) Patent No.: US 12,180,849 B1
(45) Date of Patent: Dec. 31, 2024

(54) MITIGATION OF ROTATING STALL IN TURBINE EXHAUST SECTION USING FLOW CONTROL VANES DISPOSED THEREIN

(71) Applicant: GE Infrastructure Technology LLC, Greenville, SC (US)

(72) Inventors: Shashwat Swami Jaiswal, Bangalore (IN); Moorthi Subramaniyan, Bangalore (IN); Gunnar Leif Dan Siden, Greenville, SC (US); Nisha Singh, Bangalore (IN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/395,326

(22) Filed: Dec. 22, 2023

(51) Int. Cl.
*F01D 17/16* (2006.01)
*F01D 5/14* (2006.01)
*F01D 17/14* (2006.01)
*F01D 25/30* (2006.01)

(52) U.S. Cl.
CPC ........... *F01D 17/167* (2013.01); *F01D 5/141* (2013.01); *F01D 17/143* (2013.01); *F01D 25/30* (2013.01); *F05D 2250/70* (2013.01)

(58) Field of Classification Search
CPC ...... F01D 25/30; F01D 17/143; F01D 17/167; F01D 21/14; F05D 2240/127; F05D 2270/022
See application file for complete search history.

(56) References Cited

U.S. PATENT DOCUMENTS

| | | | | |
|---|---|---|---|---|
| 4,579,507 | A * | 4/1986 | Corrigan | F01D 17/162 415/150 |
| 8,641,362 | B1 | 2/2014 | Liang | |
| 9,546,567 | B2 | 1/2017 | Kasibhotla et al. | |
| 2008/0063516 | A1* | 3/2008 | Fridsma | F01D 25/30 415/148 |
| 2015/0354382 | A1 | 12/2015 | Pakkala et al. | |
| 2018/0149085 | A1 | 5/2018 | Chennoju et al. | |
| 2018/0216527 | A1* | 8/2018 | D'Angelo | F02C 3/04 |
| 2019/0257246 | A1* | 8/2019 | Higgins | F02C 3/08 |

* cited by examiner

*Primary Examiner* — Courtney D Heinle
*Assistant Examiner* — Andrew J Marien
(74) *Attorney, Agent, or Firm* — Fletcher Yoder, P.C.

(57) ABSTRACT

A system includes a turbine exhaust section having an exhaust flow path, an inner exhaust wall radially disposed along the exhaust flow path, an outer exhaust wall disposed radially outward of the inner exhaust wall and along the exhaust flow path, and a flow control vane extending between a first end and a second end. The first and second ends are circumferentially offset from one another. The flow control vane is configured to move between a retracted position along the outer exhaust wall and an extended position extending from the outer exhaust wall toward the inner exhaust wall. The second end is disposed radially inward from the first end while the flow control vane is disposed in the extended position.

20 Claims, 16 Drawing Sheets

MITIGATION OF ROTATING STALL IN TURBINE EXHAUST SECTION USING FLOW CONTROL VANES DISPOSED THEREIN

TECHNICAL FIELD

The subject matter disclosed herein relates to mitigation of rotating stall formation in a low pressure turbine section of a turbine (e.g., an expansion turbine of a gas turbine engine) or an exhaust section downstream of the turbine. The exhaust section of the gas turbine engine is provided with a recirculation blockage system including flow control vanes selectively extending into the exhaust section to mitigate the formation of rotating stall cells as may occur during low-flow operating conditions of the gas turbine engine. The flow control vanes have first and second ends that are circumferentially offset from one another.

BACKGROUND

A gas turbine engine may operate in various conditions, such as a steady state condition, a transient condition (e.g., startup or shutdown), a full-load condition, or a part-load condition. Unfortunately, when operating in a low flow operating condition (e.g., transient or part-load conditions), the gas turbine engine may be susceptible to a rotating stall condition. The rotating stall condition involves a reversed flow with rotating stall cells forming in the low pressure turbine section of the gas turbine engine. The rotating stall cells rotate at a fraction of a rotational speed of the gas turbine engine (i.e., at low frequency), thereby causing an asynchronous high cycle fatigue on turbine blades in the low pressure turbine section. Accordingly, a need exists for at least mitigating or preventing the rotating stall condition in gas turbine engines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a turbine exhaust section having an exhaust flow path, an inner exhaust wall radially disposed along the exhaust flow path, an outer exhaust wall disposed radially outward of the inner exhaust wall and along the exhaust flow path, and a flow control vane extending between a first end and a second end. The first and second ends are circumferentially offset from one another. The flow control vane is configured to move between a retracted position along the outer exhaust wall and an extended position extending from the outer exhaust wall toward the inner exhaust wall. The second end is disposed radially inward from the first end while the flow control vane is disposed in the extended position.

In another embodiment, a system includes a turbine exhaust section having an exhaust flow path, an inner exhaust wall radially disposed along the exhaust flow path, an outer exhaust wall radially disposed along the exhaust flow path, and a flow control vane extending between a first end and a second end. The first and second ends are circumferentially offset from one another. The flow control vane is configured to move between a retracted position and an extended position. The flow control vane is disposed along one of the inner and outer exhaust walls in the retracted position. The flow control vane extends between the outer exhaust wall and the inner exhaust wall in the extended position. The flow control vane extends radially between the first and second ends in the extended position.

In another embodiment, a system includes a turbine exhaust section having an exhaust flow path, an inner exhaust wall radially disposed along the exhaust flow path, an outer exhaust wall radially disposed along the exhaust flow path, and a flow control vane extending between a first end and a second end. The first and second ends are circumferentially offset from one another. The flow control vane is configured to move between a retracted position and an extended position. The flow control vane is disposed along one of the inner and outer exhaust walls in the retracted position. The flow control vane extends between the outer exhaust wall and the inner exhaust wall in the extended position. The flow control vane extends radially between the first and second ends in the extended position. The flow control vane has a variable width between the first and second ends.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
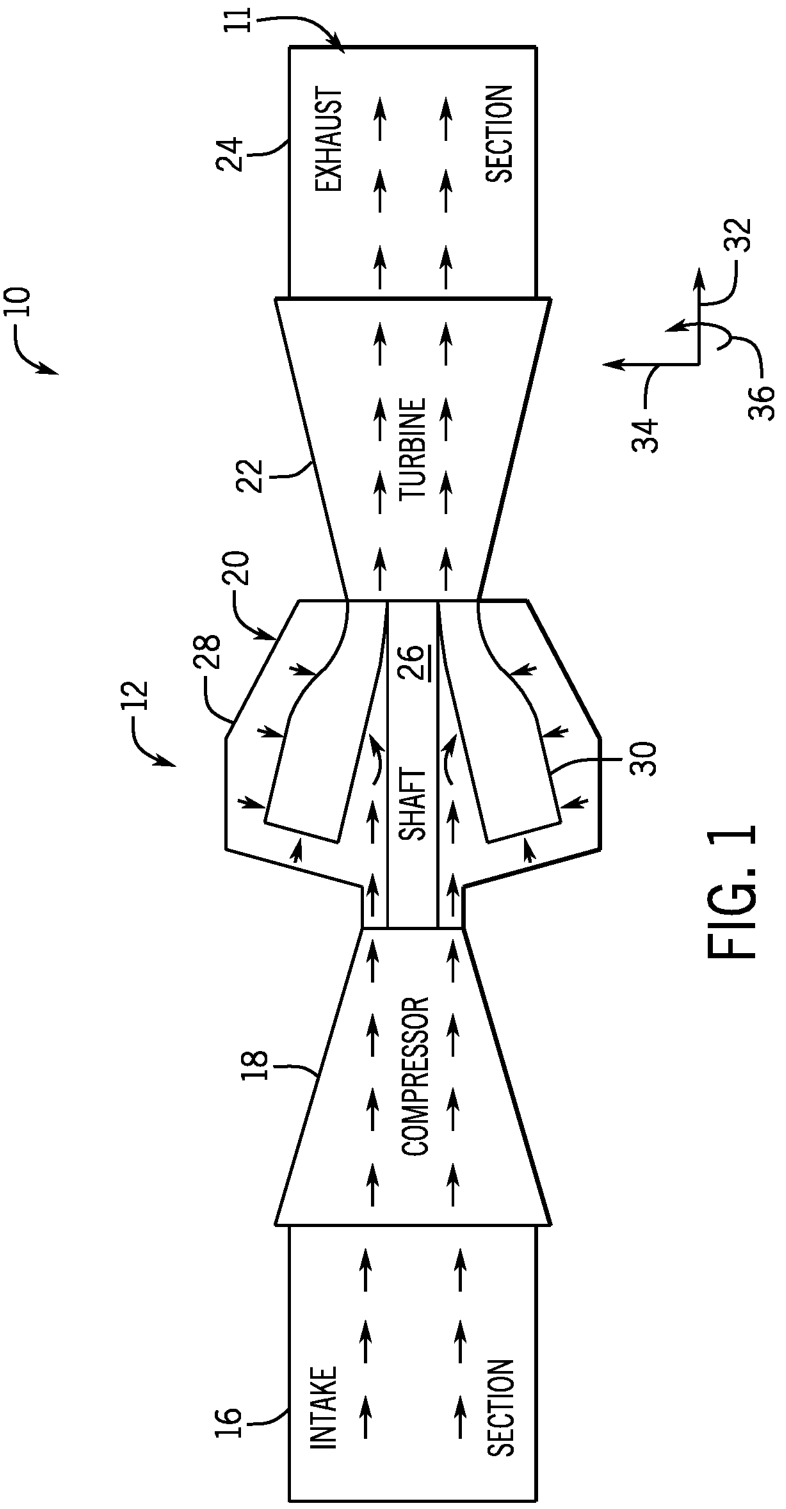
FIG. 1 is a schematic flow diagram of an embodiment of a turbine system having a gas turbine engine with a recirculation blockage system configured to mitigate formation of a rotating stall condition.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described in greater detail below, the disclosed embodiments enable a mitigation of a rotating stall condition in a low pressure turbine section of a gas turbine engine via mitigation of a reversed flow and formation of rotating stall cells downstream of the last stage blades of the gas turbine engine. For example, certain embodiments include a plurality of inner flow control vanes (e.g., radially inner vanes) disposed on an inner exhaust wall (e.g., inner diameter) of the exhaust section of the gas turbine engine. The plurality of inner flow control vanes is axially aligned (e.g., common axial position) to form a segmented inner dam (e.g., segmented inner annular flow barrier wall). The inner dam is configured to separate a reverse flow of the exhaust gas (e.g., exhaust flow path) into an upstream vortex and a downstream vortex. The upstream vortex maintains its tangential velocity, thereby reducing the velocity gradient of a shear layer disposed directly after the last stage blades (e.g., last stage of turbine blades) of the turbine section. The reduction in velocity gradient of the shear layer reduces the likelihood of a rotating stall condition in the low pressure turbine section. In certain embodiments, the inner dam may be accompanied by a segmented outer dam (e.g., segmented outer annular flow barrier wall having a plurality of outer flow control vanes) disposed on an outer exhaust wall of the exhaust section. The outer dam may be configured to squeeze the exhaust flow path, thereby improving an effectiveness of the inner dam.

In certain embodiments, the formation of rotating stall may be mitigated using auxiliary struts (e.g., radial auxiliary struts) circumferentially disposed between adjacent struts (e.g., radial diffuser struts) of the exhaust section of the gas turbine engine. In certain embodiments, the auxiliary strut may include an inner portion (e.g., radially inner flow control vane), a central portion (e.g., radially intermediate flow control vane), and an outer portion (e.g., radially outer flow control vane). The inner and outer portions (e.g., flow control vanes) are configured to rotate about a pivot to circumferentially angled positions, while the middle portion is configured to remain stationary and refrain from rotating. The rotation of the inner and outer portions of the auxiliary strut causes blockage of the exhaust flow path directly below the outer exhaust wall and directly above the inner exhaust wall, thereby increasing a tangential velocity of the reverse flow of the exhaust flow path and reducing the velocity gradient of the shear layer adjacent the last stage blades (e.g., last stage of turbine blades). The reduction of the velocity gradient of the shear layer reduces the likelihood of a rotating stall cell from forming in the low pressure turbine section, which is immediately upstream of the exhaust section.

In certain embodiments, the formation of rotating stalls may be mitigated using a flow redirection vane (e.g., flow control vane, mixing vane) configured to direct a portion of the high velocity free stream flow near the outer exhaust wall (e.g., outer diameter) to the reverse flow at the inner exhaust wall (e.g., inner diameter). When the high velocity free stream flow is added to the reverse flow, the tangential velocity of the reverse flow increases adjacent the last stage blades (e.g., last stage of turbine blades), thereby reducing the velocity gradient of the shear layer and mitigating the likelihood of a rotating stall forming. The flow redirection vane may be configured to retract into a recess disposed in the outer exhaust wall during normal operating conditions of the gas turbine engine.

FIG. 1 is a schematic flow diagram of an embodiment of a turbine system 10 having a gas turbine engine 12 with a recirculation blockage system 11 (e.g., a rotating stall prevention system). As discussed in detail below, the recirculation blockage system 11 includes one or more sets of flow control vanes 13 (see FIG. 2) configured to block flow recirculation (e.g., flow reversal) of an exhaust gas into a last turbine stage, thereby helping to reduce the possibility of a rotating stall condition. In certain embodiments, the turbine system 10 may include an aircraft, a locomotive, a power generation system, or combinations thereof. In serial flow order, the illustrated gas turbine engine 12 includes an air intake section 16, a compressor or compressor section 18, a combustor or combustor section 20, a turbine or turbine section 22 (i.e., an expansion turbine), and an exhaust section 24. The turbine section 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine section 22. The compressed air from the compressor 18 enters the combustor section 20, where the compressed air and fuel mix and combust within combustors to drive the turbine section 22. From the combustor section 20, the hot combustion gases flow through the turbine section 22, driving the compressor 18 via the shaft 26. For example, the combustion gases may apply motive forces to turbine blades within the turbine section 22 to rotate the shaft 26. After flowing through the turbine section 22, the hot combustion gases may exit the gas turbine engine 12 through the exhaust section 24. As described below, the recirculation blockage system 11 may include one or more sets of flow control vanes 13 (see FIG. 2) disposed in the exhaust section 24 at least proximate to a last turbine stage of the turbine section 22, such as between the last turbine stage of the turbine section 22 and a plurality of struts in the exhaust section 24. The gas turbine engine 12 may be described in terms of a longitudinal direction or axis 32 (e.g., axial direction), a radial direction or axis 34, and a circumferential direction or axis 36.

Figure 2:
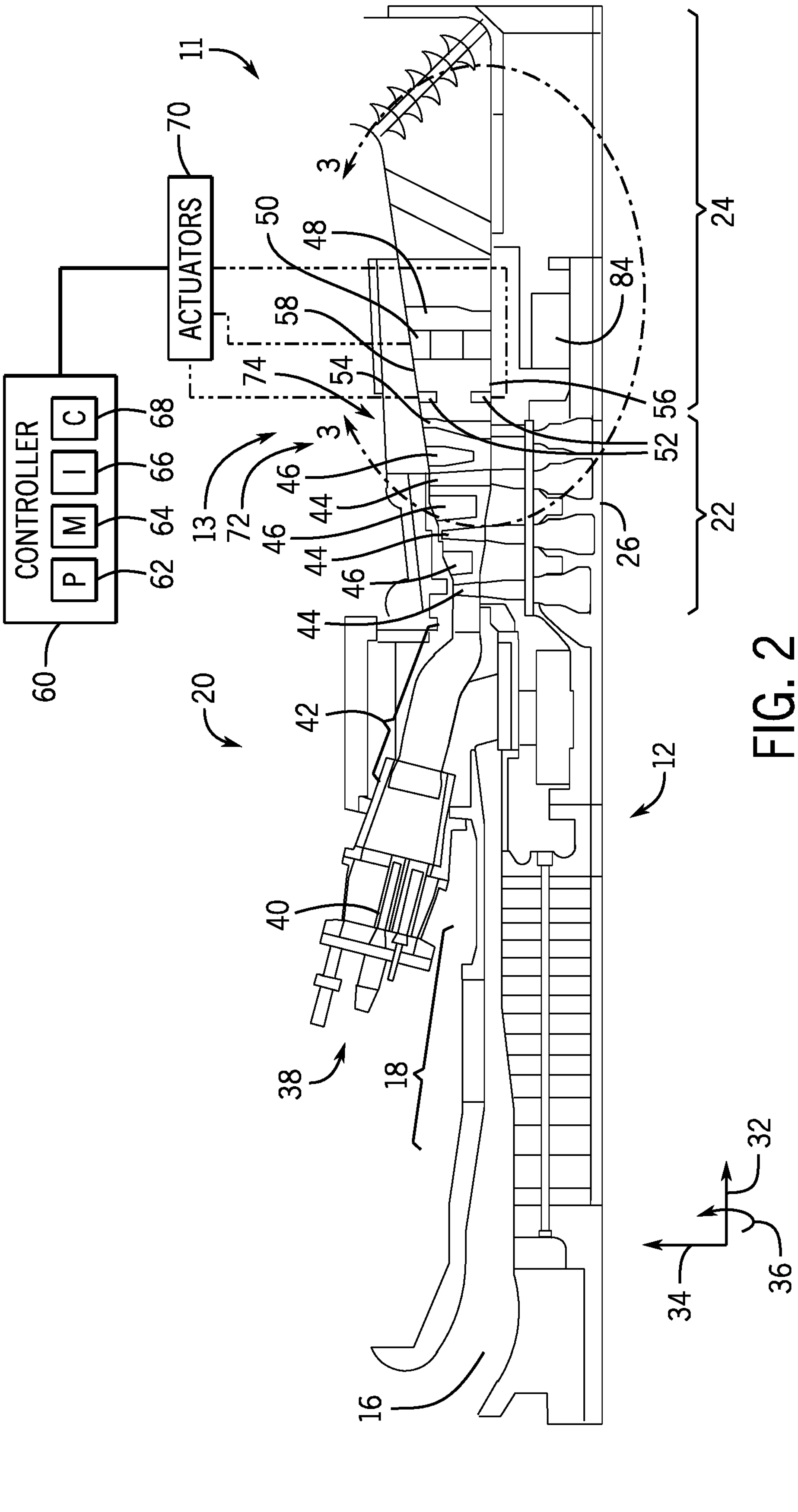
FIG. 2 is a cross-sectional side view of an embodiment of the gas turbine engine of FIG. 1 sectioned through the longitudinal axis, illustrating an embodiment of the recirculation blockage system.

FIG. 2 is a cross-sectional side view of an embodiment of the gas turbine engine 12 of FIG. 1 sectioned through the longitudinal axis 32, illustrating an embodiment of the recirculation blockage system 11. As described above with respect to FIG. 1, air may enter the gas turbine engine 12 through the air intake section 16 and may be compressed by the compressor 18. The compressed air from the compressor 18 may then be directed into the combustor section 20 where the compressed air may be mixed with fuel. The combustor section 20 includes one or more combustors 38. In certain embodiments, the gas turbine engine 12 may include multiple combustors 38 disposed in an annular arrangement. Further, each combustor 38 may include multiple fuel nozzles 40 attached to or near a head end of each combustor 38 in an annular or other arrangement. In operation, the fuel nozzles 40 may inject a fuel-air mixture into the combustors 38 in a suitable ratio for optimal combustion, emissions, fuel consumption, and power output. Within the combustor section 20, the fuel-air mixture may combust to generate hot, pressurized combustion gases. After combustion, the hot pressurized combustion gases may flow through a transition piece 42 and exit the combustor section 20 to the turbine section 22. Within the turbine section 22, the pressurized combustion gases may turn blades 44 (e.g., rotating turbine blades) that extend radially within the turbine section 22 and that are disposed between vanes 46 (e.g., stationary turbine vanes) to rotate the shaft 26 before exiting through the exhaust section 24 as exhaust gas.

In certain embodiments, the turbine section 22 may include one or more turbine stages (e.g., 1, 2, 3, 4, or more) disposed at different axial positions along the longitudinal axis 32 of the turbine section 22. Each turbine stage has a plurality of blades 44 (e.g., rotary turbine blades) spaced apart from one another in a circumferential arrangement about the longitudinal axis 32 of the turbine section 22 at a common axial position, wherein the blades 44 are coupled to a central turbine rotor or shaft of the turbine section 22. Similarly, each turbine stage has a plurality of vanes 46 (e.g., stationary turbine vanes) spaced apart from one another in a circumferential arrangement about the longitudinal axis 32 of the turbine section 22 at a common axial position offset from the blades 44, wherein the vanes 46 are coupled to an outer casing or wall of the turbine section 22. In operation, the pressurized combustion gases progressively flow through each of the turbine stages to drive rotation of the turbine section 22. Thus, one or more upstream turbine stages may be considered high pressure (HP) turbine stages, one or more intermediate turbine stages may be considered intermediate pressure (IP) turbine stages, and one or more downstream turbine stages may be considered low pressure (LP) turbine stages. The LP turbine stages 72, which may include one or more LP turbine stages with blades 44 and vanes 46, include a last turbine stage 74 upstream from the exhaust section 24. The recirculation blockage system 11 is configured to block recirculation (e.g., reversed flow) of exhaust gas in the LP turbine stages 72, particularly in the last turbine stage 74, thereby helping to reduce the possibility of a rotating stall condition in the turbine section 22 when the gas turbine engine 12 is operating in a low-flow operating condition.

In the illustrated embodiment, the recirculation blockage system 11 includes a plurality of sets of flow control vanes 13. The exhaust section 24 may include at least one strut 48 (e.g., radial diffuser strut) downstream from last stage blades 54 (e.g., blades 44 in the last turbine stage 74) of the turbine section 22, wherein each strut 48 extends radially between an inner exhaust wall 56 (e.g., inner diameter wall, inner annular wall, or inner hub) and an outer exhaust wall 58 (e.g., outer diameter wall or outer annular wall) of the exhaust section 24 (e.g., annular exhaust duct). For example, the exhaust section 24 may include 2, 3, 4, 5, 6, 7, 8, 9, 10, or more struts 48 spaced apart from one another in a circumferential arrangement about the longitudinal axis 32 of the turbine section 22 at a common axial position downstream from the last stage blades 54. The plurality of sets of flow control vanes 13 may be arranged in one or more sets at one or more axial positions relative to the longitudinal axis 32, wherein the axial positions may include one or more intermediate axial positions disposed between the blades 44 and vanes 46 in the last turbine stage 74 (and/or other low pressure turbine stages 72) of the turbine section 22, one or more intermediate axial positions downstream of the last stage blades 54 of the turbine section 22 and upstream of the at least one strut 48, and/or in other axial positions suitable to block a reverse flow of exhaust gas into the last stage blades 54.

Figure 3:
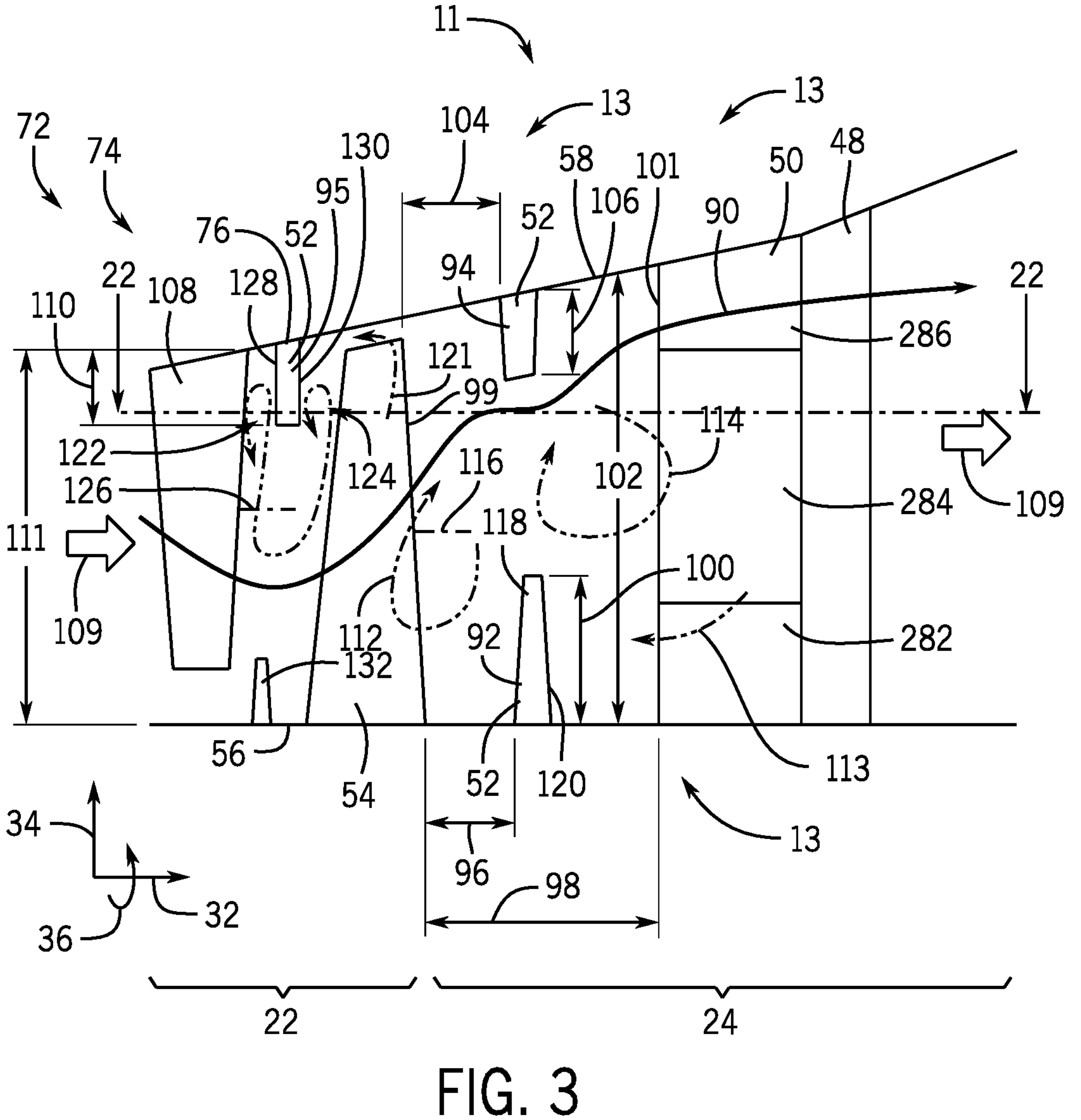
FIG. 3 is a cross-sectional side view of an embodiment of the recirculation blockage system of FIG. 2 taken within line 3-3, further illustrating flow control vanes in a turbine section and an exhaust section of the gas turbine engine.

As shown in FIG. 3, one set of flow control vanes 13 includes flow control vanes 92 and 94, which are disposed on the inner exhaust wall 56 and the outer exhaust wall 58 of the exhaust section 24, respectively, in the axial span between the last turbine blades 54 and the at least one exhaust strut 48. Additionally, or alternately, the turbine section 22 may include another set of flow control vanes 13 (i.e., flow control vanes 132, 95), which are disposed on an inner turbine wall 78 of the turbine 22 and an outer turbine wall 76 of the turbine 22, respectively, in the axial span between the last turbine nozzles 46 and the last turbine blades 54. Each set of flow control vanes 13 may include a plurality of flow control vanes spaced apart from one another in a circumferential arrangement about the longitudinal axis 32 of the turbine 22 at a common axial position, wherein the flow control vanes 13 may be configured to extend or retract depending on operating conditions (e.g., extend during low flow operating conditions, such as during part-load and/or transient operating conditions, and retract during normal steady state and/or full-load operating conditions). As shown, at least one set of the flow control vanes 13 (e.g., 92, 132) may be disposed on the inner exhaust wall 56 of the exhaust section 24 and/or the inner turbine wall 78 of the turbine section 22, and, in certain embodiments, at least one set of the flow control vanes 13 (e.g., 94, 95) may be disposed on the outer exhaust wall 58 of the exhaust section 24 and/or the outer turbine wall 76 of the turbine section 22.

In certain embodiments, one or more sets of flow control vanes 13 may be disposed circumferentially 36 between the struts 48 and at least partially axially overlapping with the struts 48 along the longitudinal axis 32. For example, the recirculation blockage system 11 may include at least one auxiliary strut 50 (e.g., radial auxiliary strut) having one or more flow control vanes 13. Each auxiliary strut 50 extends radially 34 between the inner exhaust wall 56 and the outer exhaust wall 58 of the exhaust section 24, wherein each auxiliary strut 50 is disposed circumferentially 36 between adjacent struts 48. For example, the exhaust section 24 may include 2, 3, 4, 5, 6, 7, 8, 9, 10, or more auxiliary struts 50 spaced apart from one another in a circumferential arrangement about the longitudinal axis 32 of the turbine section 22 at a common axial position at least partially axially overlapping with the struts 48.

For example, leading edges of the auxiliary struts 50 may be axially aligned with leading edges of the struts 48, while trailing edges of the auxiliary struts 50 may be axially upstream from trailing edges of the struts 48. Thus, the auxiliary struts 50 may be shorter than the struts 48 in the axial direction along the longitudinal axis 32. Each auxiliary strut 50 may include one or more flow control vanes 13 configured to rotate between an axial orientation aligned with the longitudinal axis 32 and an angled orientation crosswise to the longitudinal axis 32 (e.g., rotated in the circumferential direction 36). As discussed in further detail below, the flow control vanes 13 on each auxiliary strut 50 may include a radially inner flow control vane adjacent the inner exhaust wall 56 and a radially outer flow control vane adjacent the outer exhaust wall 58. Various aspects of the flow control vanes 13 and the auxiliary struts 50 of the recirculation blockage system 11 are discussed in further detail below.

In various embodiments and as illustrated in FIG. 2, the recirculation blockage system 11 also includes a controller 60, which may be configured to monitor operating conditions of the turbine system 10 and to control positions of the flow control vanes 13 to help block a reversed flow of exhaust gas and at least mitigate or prevent a rotating stall condition in the turbine section 22. In certain embodiments, the controller 60 may include a processor 62, a memory 64, instructions 66 stored on the memory 64 and executable by the processor 62, and communication circuitry 68 configured to communicate with actuators 70 coupled to the flow control vanes 13. The actuators 70 may include electric actuators (e.g., electric motors or drives), fluid actuators (e.g., pneumatic or hydraulic actuators), or any combination thereof. In certain embodiments, each set of the flow control vanes 13 may be coupled to a single actuator 70 or multiple actuators 70 (e.g., one actuator per one vane 13 or per subset of multiple vanes 13), such that the controller 60 can operate the one or more actuators 70 to move the flow control vanes 13 between extended and retracted positions in response to operating conditions of the turbine system 10.

For example, the controller 60 may control the one or more actuators 70 to move the flow control vanes 13 to the extended position in response to sensor feedback indicating a reversed flow of the exhaust gas, a low flow condition (e.g., during part-load and/or transient operating conditions), or a rotating stall condition. However, the controller 60 may control the one or more actuators 70 to move the flow control vanes 13 to the retracted position in the absence of the foregoing conditions, such as in response to sensor feedback indicating a normal downstream flow of the exhaust gas and/or a normal flow condition (e.g., during full-load and/or steady state operating conditions). In some embodiments, one or more sets of the flow control vanes 13 may be passively operated in response to operating conditions, such as by moving from the retracted position to the extended position in response to the reversed flow. Various aspects of operation of the flow control vanes 13 are discussed in further detail below.

FIG. 3 is a cross-sectional side view of an embodiment of the turbine system 10 of FIG. 2 taken within line 3-3, further illustrating aspects of the recirculation blockage system 11 disposed in the exhaust section 24 and the turbine section 22. The turbine section 22 includes a hot gas flow path disposed radially between the inner turbine wall 78 and the outer turbine wall 76. Similarly, the exhaust section 24 includes an exhaust flow path disposed radially between the inner exhaust wall 56 and the outer exhaust wall 58, wherein the inner exhaust wall 56 is a radially inner wall (e.g., inner diameter wall or inner annular wall) while the outer exhaust wall 58 is a radially outer wall (e.g., outer diameter wall or outer annular wall). As shown and discussed in further detail below, the flow control vanes 13 include one or more sets of the flow control vanes 13 (e.g., inner flow control vanes 92 and 132 and outer flow control vanes 94 and 95) in the turbine section 22 and/or the exhaust section 24. The exhaust section 24 also includes the struts 48 and, in certain embodiments, the auxiliary struts 50 having the flow control vanes 13.

Each set of the flow control vanes 13 (e.g., 92, 94, 95, and 132) may include a plurality of flow control vanes spaced apart from one another in a circumferential arrangement about the longitudinal axis 32 of the turbine section 22 at a common axial position, wherein the flow control vanes 13 may be configured to selectively extend or retract depending on operating conditions (e.g., extend during low flow operating conditions, such as during part-load and/or transient operating conditions, and retract during normal steady state and/or full-load operating conditions). For example, each flow control vane 13 disposed adjacent a wall (e.g., inner and outer turbine wall 78, 76 in the turbine section 22 or inner and outer exhaust wall 56, 58 of the exhaust section 24) may be substantially parallel or flush with the respective wall and/or oriented in an axial direction along the longitudinal axis 32 in a retracted position, whereas each flow control vane 13 may protrude from the wall in a substantially crosswise orientation or angular orientation at an angle relative to the wall in an extended position. For example, the angle may be 90 degrees. In many embodiments, the angle is an acute angle, which may be 10 to 89 degrees, 20 to 80 degrees, 30 to 70 degrees, or 40 to 60 degrees. Each flow control vane 13 may be configured to selectively move between the retracted position and the extended position via a transverse movement crosswise to the wall (e.g., crosswise to the longitudinal axis 32 or along the radial axis 34), an axial movement parallel to the wall (e.g., parallel to the longitudinal axis 32), a rotational movement, or a combination thereof.

The movement of the flow control vane 13 may be actively operated by the actuators 70 coupled to the controller 60 and/or passively operated in response to flow conditions (e.g., reversed flow) in the turbine section 22 (e.g., last turbine stage 74) and/or the exhaust section 24. For example, the flow control vanes 13 may be biased toward the retracted position by one or more springs, such that a reversed flow of the exhaust gas overcomes the spring force to cause the flow control vanes 13 to move from the retracted position to the extended position. By further example, the flow control vanes 13 may be biased toward the extended position by one or more springs, such that a normal flow of the exhaust gas overcomes the spring force to cause the flow control vanes 13 to move from the extended position to the retracted position and such that a low flow and/or a reversed flow of the exhaust gas allows the spring force to hold the flow control vanes 13 in the extended position.

The flow control vanes 13 coupled to the auxiliary struts 50 may operate in a similar manner, such that the flow control vanes 13 can selectively move between extended and retracted positions. For example, the flow control vanes 13 may be oriented in an axial direction along the longitudinal axis 32 in the retracted position (e.g., axial position), whereas the flow control vanes 13 may be oriented in a crosswise direction relative to the longitudinal axis 32 (e.g., oriented in the circumferential direction 36) in the extended position (e.g., circumferential position). The flow control vanes 13 coupled to the auxiliary struts 50 may be actively operated by the actuators 70 and the controller 60 as discussed above, or the flow control vanes 13 may be passively operated in response to operating conditions (e.g., a reversed flow and/or a low flow of the exhaust gas). Various aspects of the flow control vanes 13 coupled to the auxiliary struts 50 are discussed in further detail below.

As shown in FIG. 3, the inner flow control vanes 92 extend radially outward from the inner exhaust wall 56 at an axial position disposed downstream from a downstream edge 99 (e.g., trailing edge) of the last stage blades 54 (e.g., measured from the downstream edge 99 adjacent the inner exhaust wall 56) by an inner axial distance 96 in the longitudinal direction 32. The inner axial distance 96 is less than an axial length 98 between the downstream edge 99 (e.g., trailing edge) of the last stage blades 54 and the upstream edge 101 (e.g., leading edge) of the struts 48 and/or the auxiliary struts 50. For example, the inner axial distance 96 may range from 10 to 90 percent, 15 to 85 percent, 20 to 80 percent, 25 to 75 percent, 30 to 70 percent, 35 to 65 percent, 40 to 60 percent, or 45 to 55 percent of the axial length 98. In some embodiments, the inner axial distance 96 may be less than, equal to, or greater than 10, 20, 30, 40, 50, 60, or 70 percent of the axial length 98, while the inner control vanes 92 are upstream from the struts 48 and/or auxiliary struts 50. For example, the inner axial distance 96 may be approximately 5, 10, 15, 20, 25, 30, 35, 40, 45, 50, 55, 60, 65, or 70 percent of the axial length 98, plus or minus about 1, 2, 3, 4, 5 percent of the axial length 98.

A radial length 100 (e.g., height in radial direction 34) of the inner flow control vane 92 is less than a radial width 102 spanning from the inner exhaust wall 56 to the outer exhaust wall 58 (e.g., radial width 102 measured from the axial location of the inner flow control vane 92). For example, the radial length 100 of the inner control vane 92 may range from 10 to 20 percent, 10 to 30 percent, 10 to 40 percent, 10 to 50 percent, or 10 to 60 percent of the radial width 102. In some embodiments, the radial length 100 may be less than, equal to, or greater than 5, 10, 15, 20, 25, 30, 35, 40, 45, 50, 55, or 60 percent of the radial width 102, while the radial length 100 is less than the radial width 102. For example, the radial length 100 may be approximately 5, 10, 15, 20, 25, 30, 35, 40, 45, 50, 55, or 60 percent of the radial width 102, plus or minus about 1, 2, 3, 4, 5 percent of the radial width 102.

In certain embodiments, the exhaust section 24 includes one or more sets of the outer flow control vanes 94 disposed on the outer exhaust wall 58. The outer flow control vanes 94 extend radially inward from the outer exhaust wall 58 at an axial position disposed downstream from the downstream edge 99 (e.g., trailing edge) of the last stage blades 54 (e.g., measured from the downstream edge 99 adjacent the inner exhaust wall 56) by an outer axial distance 104 in the longitudinal direction 32. The outer axial distance 104 is less than the axial length 98 between the downstream edge 99 (e.g., trailing edge) of the last stage blades 54 and the upstream edge 101 (e.g., leading edge) of the struts 48 and/or the auxiliary struts 50. For example, the outer axial distance 104 may range from 10 to 90 percent, 15 to 85 percent, 20 to 80 percent, 25 to 75 percent, 30 to 70 percent, 35 to 65 percent, 40 to 60 percent, or 45 to 55 percent of the axial length 98. In some embodiments, the outer axial distance 104 may be less than, equal to, or greater than 10, 20, 30, 40, 50, 60, or 70 percent of the axial length 98, while the outer control vanes 94 are upstream from the struts 48 and/or auxiliary struts 50. For example, the outer axial distance 104 may be approximately 5, 10, 15, 20, 25, 30, 35, 40, 45, 50, 55, 60, 65, or 70 percent of the axial length 98, plus or minus about 1, 2, 3, 4, 5 percent of the axial length 98.

In certain embodiments, the outer flow control vanes 94 may be axially aligned (e.g., in the longitudinal direction 32) with the inner control vanes 92, such that the inner and outer axial distances 96 and 104 are the same as one another, and the axial positions of the vanes 92 and 94 are the same as one another. However, in some embodiments, one or more sets of the outer flow control vanes 94 may be disposed at axial positions upstream, downstream, and/or axially aligned with axial positions of one or more sets of the inner flow control vanes 92.

A radial length 106 (e.g., height in radial direction 34) of the outer flow control vanes 94 is less than the radial width 102 spanning between the inner exhaust wall 56 and the outer exhaust wall 58 (e.g., radial width 102 measured from the axial position of the outer flow control vane 94). For example, the radial length 106 of the outer flow control vanes 94 may range from 10 to 20 percent, 10 to 30 percent, 10 to 40 percent, 10 to 50 percent, or 10 to 60 percent of the radial width 102 at an axial position of the outer flow control vane 94. In some embodiments, the radial length 106 may be less than, equal to, or greater than 5, 10, 15, 20, 25, 30, 35, 40, 45, 50, 55, or 60 percent of the radial width 102, while the radial length 106 is less than the radial width 102. For example, the radial length 106 may be approximately 5, 10, 15, 20, 25, 30, 35, 40, 45, 50, 55, or 60 percent of the radial width 102, plus or minus about 1, 2, 3, 4, 5 percent of the radial width 102.

In certain embodiments, the radial lengths 100 and 106 may be the same or different from one another. For example, the radial lengths 106 of one or more sets of outer flow control vanes 94 may be less than, equal to, or greater than the radial lengths 100 of one or more sets of inner flow control vanes 92. In embodiments in which the inner flow control vanes 92 and the outer flow control vanes 94 are axially aligned, the radial lengths 100, 106 of each of the inner flow control vanes 92 and the outer flow control vanes 94 is less than 40 percent of the radial width 102.

The inner flow control vanes 92 are configured to mitigate formation of a hub vortex (e.g., vortex adjacent the inner exhaust wall 56 or hub) due to a reversed flow 113 disposed after the last stage blades 54 (e.g., after last turbine stage 74) via compartmentalization of the hub vortex (or reversed flow 113) into an upstream hub vortex 112 and a downstream hub vortex 114 relative a downstream flow direction 109 of exhaust gas through the turbine section 22 and the exhaust section 24. As shown, the inner flow control vanes 92 are configured to separate the reversed flow 113 (e.g., exhaust gas flowing opposite to the downstream flow direction 109) into the downstream hub vortex 114 (e.g., having a low tangential velocity) and the upstream hub vortex 112. The separation of the upstream hub vortex 112 and the downstream hub vortex 114 via the inner flow control vanes 92 enables the upstream hub vortex 112 to retain a high tangential velocity, thereby reducing the velocity gradient at a shear layer 116 located directly downstream of the last stage blades 54. The reduction in velocity gradient at the shear layer 116 reduces the likelihood of a non-axisymmetric stall cell of a significant strength from forming.

In certain embodiments, an upstream surface 118 of the inner flow control vane 92 is smooth in order to reduce friction between the upstream hub vortex 112 and the inner flow control vane 92 in order to mitigate reduction in tangential velocity of the upstream hub vortex 112. Additionally, or alternatively, a downstream surface 120 of the inner flow control vane 92 may include swirler features (e.g., protruding swirl vanes and/or recessed swirl slots) configured to increase the tangential velocity of the reversed flow 113 flowing toward the upstream hub vortex 112, as discussed in more detail below. For example, as discussed in further detail below, the swirl vanes 210 of FIGS. 6-8 and/or the flow control vanes 13 of FIG. 11 may be oriented to help induce and/or increase the tangential velocity of the upstream hub vortex 112.

In certain embodiments, the turbine section 22 includes one or more sets of the outer flow control vanes 95 disposed on the outer turbine wall 76 in the turbine section 22. As shown, the outer flow control vanes 95 extend radially inward from the outer turbine wall 76 at an intermediate position within the last turbine stage 74, e.g., axially between last stage vanes 108 (e.g., vanes 46 of the last turbine stage 74) of the turbine section 22 and last stage blades 54 (e.g., blades 44 of the last turbine stage 74). In the illustrated embodiment, a radial length 110 (e.g., height in radial direction 34) of the outer flow control vanes 95 is less than a radial width 111 spanning from the inner turbine wall 78 to the outer turbine wall 76 of the turbine section 22 within the last turbine stage 74. For example, the radial length 110 of the outer flow control vanes 95 may range from 10 to 20 percent, 10 to 30 percent, 10 to 40 percent, 10 to 50 percent, or 10 to 60 percent of the radial width 111 at an axial position of the outer flow control vanes 95. In some embodiments, the radial length 110 may be less than, equal to, or greater than 5, 10, 15, 20, 25, 30, 35, 40, 45, 50, 55, or 60 percent of the radial width 111, while the radial length 110 is less than the radial width 111. For example, the radial length 110 may be approximately 5, 10, 15, 20, 25, 30, 35, 40, 45, 50, 55, or 60 percent of the radial width 111, plus or minus about 1, 2, 3, 4, 5 percent of the radial width 111.

Although the illustrated embodiment shows the outer flow control vane 95 being disposed between the last stage vanes 108 and the last stage blades 54 of the last turbine stage 74, the outer flow control vanes 95 may be disposed on the outer turbine wall 76 between any pair of adjacent axially spaced blades 44 and vanes 46 of the turbine section 22 (e.g., within the same turbine stage or between different turbine stages).

The outer flow control vanes 95 are configured to mitigate formation of a torus vortex (e.g., vortex adjacent the outer turbine wall 76 within the last turbine stage 74) via a reversed flow 121 after the last stage vanes 108 via compartmentalization of the torus vortex (or reversed flow 121) into an upstream torus vortex 122 and a downstream torus vortex 124. The reversed flow 121 has a high tangential velocity due to rotation of the last stage blades 54. As shown, the outer flow control vanes 95 are configured to separate the downstream torus vortex 124 (e.g., having a high tangential velocity due to rotation of the last stage blades 54) from the upstream torus vortex 122 (e.g., having a low tangential velocity adjacent the last stage vanes 108). The separation of the upstream torus vortex 122 and the downstream torus vortex 124 via the outer flow control vanes 95 enables the upstream torus vortex 122 to decrease in tangential velocity to achieve a low tangential velocity adjacent the last stage vanes 108, thereby reducing the velocity gradient at a shear layer 126 located directly downstream of the last stage vanes 108. The reduction in velocity gradient at the shear layer 126 reduces the likelihood of a non-axisymmetric stall cell of a significant strength from forming in the last turbine stage 74.

In certain embodiments, an upstream surface 128 and/or a downstream surface 130 of the outer flow control vanes 95 includes swirl features (e.g., anti-swirl features and/or counter swirl features) configured to oppose the tangential velocity of the reverse flow 121, thereby helping to achieve a decreased, zero, or negative tangential velocity of the upstream torus vortex 122 adjacent the last stage vanes 108. For example, as discussed in further detail below, the swirl vanes 210 of FIGS. 6-8 and/or the flow control vanes 13 of FIG. 11 may be oriented to help reduce the tangential velocity of the upstream torus vortex 122. In some embodiments, the downstream surface 130 of the outer flow control vanes 95 is smooth to help maintain the tangential velocity of the downstream torus vortex 124 in the same rotational direction as the last stage blades 54, as discussed in more detail below.

In certain embodiments, the outer flow control vanes 94 are configured to deflect the exhaust flow path 90, causing the exhaust flow path 90 to be squeezed between the inner flow control vanes 92 and the outer flow control vanes 94. The squeezing of the exhaust flow path 90 further improves an effectiveness of the inner flow control vanes 92. In some embodiments, the same principle may be used to further improve an effectiveness of the outer flow control vane 95 via one or more sets of inner flow control vanes 132 axially disposed on the inner turbine wall 78 between the last stage vanes 108 and the last stage blades 54. In certain embodiments, the recirculation blockage system 11 may include any number and configuration of sets of flow control vanes 13 (e.g., 92, 94, 95, 132, etc.) along the inner and outer turbine walls 78, 76 in the last turbine stage 74 and/or along the inner and outer walls 56, 58 of the exhaust section 24 and/or coupled to the auxiliary struts 50 between the adjacent struts 48. However, certain flow control vanes 13 may be optional and/or excluded in certain embodiments. For example, the outer flow control vanes 94 and 95 and the inner flow control vanes 132 may be omitted from the recirculation blockage system 11 in certain embodiments.

The turbine section 22 and/or the exhaust section 24 may include a combination of the flow control vanes 13 (e.g., the inner flow control vanes 92 and 132 and the outer flow control vanes 94 and 95), in which the number, radial lengths, circumferential spacings, geometries, and other characteristics may be same or different from one another between the different sets of flow control vanes 13. In certain embodiments, the exhaust section 24 may include the inner flow control vanes 92. In other embodiments, the exhaust section 24 may include both the inner flow control vanes 92 and the outer flow control vanes 94. In certain embodiments, the turbine section 22 may include the outer flow control vanes 95. In other embodiments, the turbine section 22 may include the outer flow control vanes 95 and the inner flow control vanes 132. In certain embodiments, the exhaust section 24 may include the inner flow control vanes 92 and the outer flow control vanes 94, and the turbine section 22 may include the outer flow control vanes 95 and the inner flow control vanes 132. In each of these embodiments, the exhaust section 24 may include or exclude the flow control vanes 13 coupled to the auxiliary struts 50.

In certain embodiments, the turbine section 22 may include flow control vanes 95 and/or 132, and the exhaust section 24 may not include flow control vanes. That is, in certain embodiments, flow control vanes 13 may be disposed longitudinally between the last stage vanes 108 and the last stage blades 54, but not longitudinally between the last stage blades 54 and the struts 48. The flow control vanes 95, 132 that may be disposed in the turbine section 22 are discussed in further detail herein.

Figure 4:
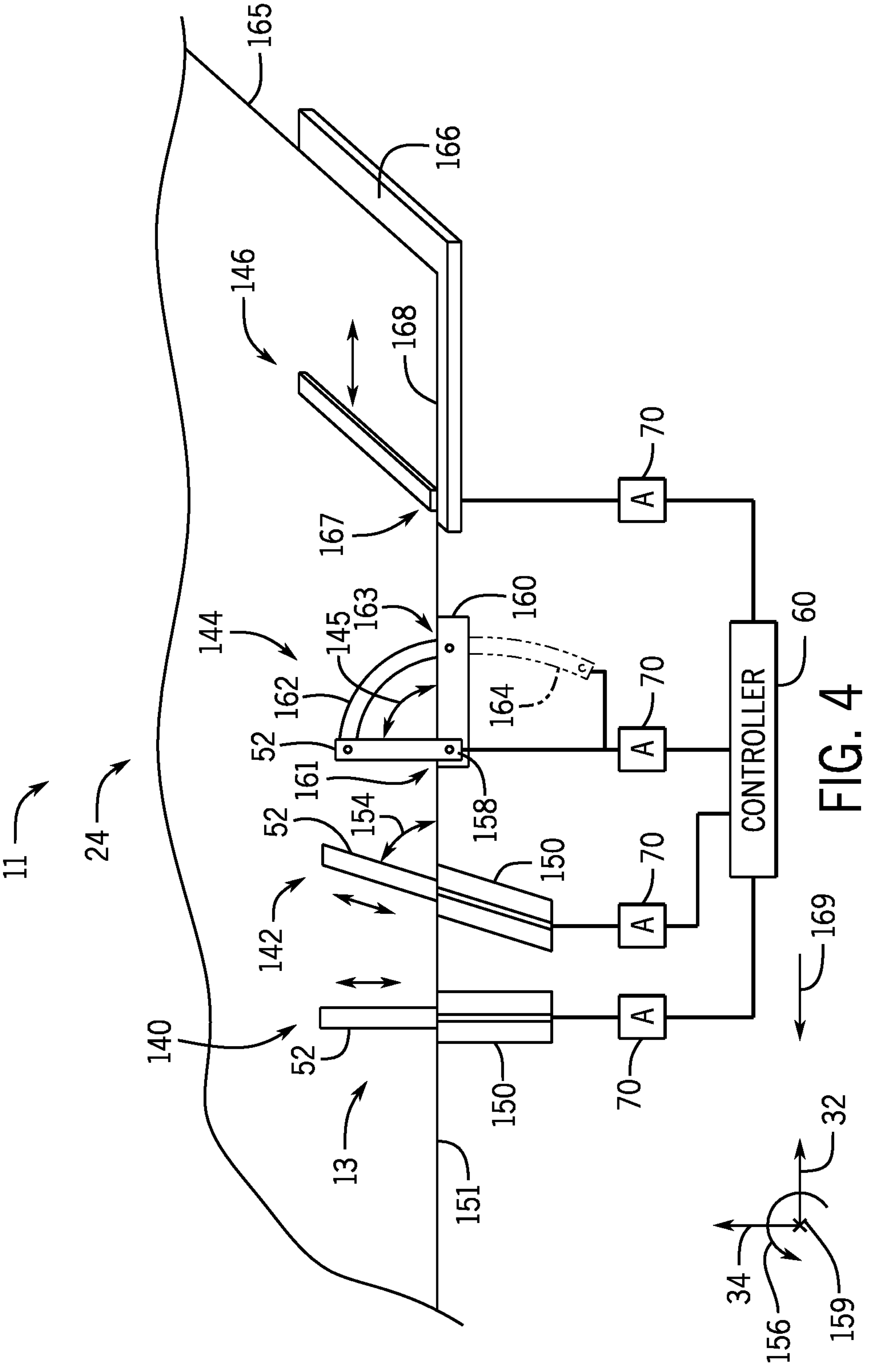
FIG. 4 is a cross-sectional side view of the exhaust section of FIG. 2, further illustrating multiple flow control vanes configured to provide flow control on one or more walls of the turbine section and the exhaust section of the gas turbine engine.

FIG. 4 is a cross-sectional side view of the recirculation blockage system 11 of FIG. 2 sectioned through the longitudinal axis 32, illustrating multiple flow control vanes 13 configured to move between retracted and extended positions relative to a wall 151 (e.g., inner turbine wall 78 and/or outer turbine wall 76 of the turbine section 22 and/or inner exhaust wall 56 and/or outer exhaust wall 58 of the exhaust section 24). The flow control vanes 13 may include one or more of a set of flow control vanes 140, a set of flow control vanes 142, a set of flow control vanes 144, and a set of flow control vanes 146, wherein each set of the flow control vanes 140, 142, 144, and 146 includes a plurality of the flow control vanes (e.g., at least 5, 10, 15, 20, 30, 40, 50, 100, or more) spaced apart from one another in a circumferential arrangement about the longitudinal axis 32 at a common axial position. One or more sets of the illustrated flow control vanes 13 (e.g., 140, 142, 144, and 146) may be used independently or in any combination with one another for any of the flow control vanes (e.g., 92, 94, 95, and 132) described herein.

The flow control vanes 13 (e.g., 140, 142, 144, and 146) are illustrated in extended positions for use in blocking a reverse flow of the exhaust gas and compartmentalizing a vortex (e.g., hub vortex or torus vortex) as discussed above. The flow control vanes 13 (e.g., 140, 142, 144, and 146) are configured to move between the extended positions and retracted positions via active control by the actuators 70 and the controller 60 or via passive control in response to a low flow and/or reversed flow of the exhaust gas. As shown, the flow control vanes 13 may extend based on the actuator 70 (e.g., electric actuator, pneumatic actuator, hydraulic actuator, etc.), which is coupled to the flow control vanes 13 and communicatively coupled to the controller 60.

The flow control vane 13 (e.g., 140, 142) is configured to move between the retracted and extended positions relative to the wall 151 via an axial movement crosswise to the wall 151 (e.g., radial direction 34) toward and away from the wall 151. In certain embodiments, an extension of the flow control vane 13 (e.g., 140, 142) radially outward from the wall 151 may include the flow control vane 13 linearly extending from a recess 150 disposed in the wall 151. In the illustrated embodiment, the flow control vane 13, 140 may extend and retract in a perpendicular direction (e.g., 90 degrees) relative to the recess 150 in the wall 151, while the flow control vane 13, 142 may extend and retract at an angle 154 relative to the recess 150 in the wall 151. Thus, the flow control vane 140 and its recess 150 may be perpendicular to the wall 151, whereas the flow control vane 142 and its recess 150 may be angled at the angle 154 relative to the wall 151.

In each configuration, the flow control vane 13 (e.g., 140, 142) moves linearly or axially in and out of the recess 150. The recess 150 may be sized to accommodate a single flow control vane 13 (e.g., 140, 142), in which case the wall 151 may define a corresponding plurality of recesses 150. Alternately, the recess 150 may be sized to accommodate multiple flow control vanes 13 (e.g., 140, 142), in which case the number of recesses 150 disposed circumferentially about the wall 151 is less than the number of flow control vanes 13. In yet another embodiment, the recess 150 may be an annular recess, which is sized to accommodate the circumferential array of flow control vanes 150. The wall 151 may include the inner turbine wall 78, the outer turbine wall 76, the inner exhaust wall 56, or the outer exhaust wall 58, and thus the flow control vanes 13 (e.g., 140, 142) may extend radially inward or radially outward in the illustrated extended positions.

In certain embodiments, the flow control vane 13 (e.g., 142) is oriented at the angle 154 measured in the counterclockwise direction 156 from the wall 151 to the flow control vane 13 (i.e., in an angular direction from the longitudinal axis 32 toward the radial axis 34), wherein the angle 154 may range from 10 to 90 degrees, 20 to 80 degrees, 30 to 70 degrees, or 40 to 60 degrees. For example, the angle 154 may be less than, equal to, or greater than 10, 20, 30, 40, 50, 60, 70, 80, or 90 degrees, plus or minus 5 or 10 degrees. In the illustrated embodiment, the angle 154 of the flow control vane 13 (e.g., 142) is a fixed angle. In some embodiments, the angle 154 of the flow control vane 13 (e.g., 142) may be a variable angle.

The flow control vane 13, 144 is configured to move between the retracted and extended positions relative to the wall 151 via a rotational movement. In certain embodiments, the radial extension of the flow control vane 13, 144 may include a rotation of the flow control vane 13 about a pivot 158 (e.g., pivot joint, rotational joint, or hinge) that extends in a lateral direction 159 (e.g., circumferential direction 36)

of the exhaust section 24. In the illustrated embodiment, the flow control vane 13, 144 is configured to rotate from a recess 160 within the wall 151 to an upright (e.g., extended) position at an angle 145 relative to the wall 151. As shown, an actuator 70 may be coupled to the controller 60 and configured to drive the flow control vane 13 via a curved arm 162 that extends from and retracts into a curved recess 164. Additionally, or alternatively, an actuator 70 may be coupled to and actuate the pivot 158 directly via a torque applied at a rotational shaft of the pivot 158.

The radial extension of the flow control vane 13 via a rotation of the flow control vane 13 about the pivot 158 is discussed in more detail herein. In the illustrated embodiment, the pivot 158 is disposed on an upstream end 161 of the flow control vane 13, and the flow control vane 13 is configured to rotate in the upstream direction during extension. In certain embodiments, the pivot 158 may be disposed on a downstream end 163 of the flow control vane 13, and the flow control vane 13 may be configured to rotate in the downstream direction during extension.

In certain embodiments, the angle 145 of the flow control vane 13 (e.g., 144) in the extended position may be preset (e.g., fixed) or variable (e.g., continuously variable or multiple different preset angles). The angle 145 may range from 10 to 90 degrees, 20 to 80 degrees, 30 to 70 degrees, or 40 to 60 degrees. For example, the angle 145 may be less than, equal to, or greater than 10, 20, 30, 40, 50, 60, 70, 80, or 90 degrees, plus or minus 5 or 10 degrees. In certain embodiments, the controller 60 may control the actuator 60 to adjust the angle 145 in the extended position based on various operating conditions (e.g., velocity of low flow and/or reverse flow, specific percentage of part-load condition, etc.).

The flow control vane 13, 146 is configured to move between the retracted and extended positions relative to the wall 151 via an axial movement along the wall 151 (e.g., along longitudinal axis 32) toward and away from a radial wall 165. The radial wall 165 may extend radially 34 away from the wall 151 at an angle, such as less than, equal to, or greater than 30, 40, 50 60, 70, 80, or 90 degrees. The radial wall 165 may be associated with a turn or bend in the exhaust section 24 (e.g., turning duct portion). In certain embodiments, the radial extension of the flow control vane 13, 146 may include an axial movement in the upstream direction 169 from a recess 166 disposed in the radial wall 165 (e.g., strut 48, strut 50). In certain embodiments, a bottom portion 167 of the flow control vane 13 (e.g., 146) may be coupled to a track 168 (e.g., axial guide) disposed on the wall 151 and extending from the recess 166 in the radial wall 165 in the upstream direction 169 away from the recess 166.

For example, the track 168 may extend in the axial direction 32 and include a male track portion coupled to a female track portion, such that the track 168 enables axial movement while blocking movement of the flow control vane 13, 146 in the radial direction 34 and the circumferential direction 36. The female track portion may be disposed on the wall 151 while the male track portion is disposed on the flow control vane 13, 146, or the male track portion may be disposed on the wall 151 while the female track portion is disposed on the flow control vane 13, 146. In either configuration, track 168 includes mating first and second track portions disposed on the respective wall 151 and the flow control vane 13, 146. In certain embodiments, the track 168 includes one or more wheels disposed in a rail (e.g., axial rail). In certain embodiments, the flow control vane 13, 146 may be configured to extend from the recess 166 via sliding along the track 168 in the upstream direction 169 away from the radial wall 165.

The flow control vanes 13, 146 may be actuated to move in the axial direction 32 along the track 168 via one or more actuators 70 coupled to the controller 60 and/or a passive actuation. In certain embodiments, the axial motion of the flow control vane 13, 146 may be based on a passive actuation based on one or more operating conditions of the turbine system 10, such as a low flow operating condition (e.g., part-load or transient operating condition), a reversed flow of exhaust gas, or a combination thereof. For example, the flow control vane 13, 146 may axially extend in the upstream direction 169 from the retracted position in the recess 166 to the extended position in response to a reversed flow of the exhaust gas exceeding a threshold velocity.

In certain embodiments, the flow control vane 13, 146 may be spring biased via one or more springs in the downstream direction into the recess 166, such that the reversed flow of the exhaust gas overcomes the spring force to move the flow control vane 13 in the upstream direction 169 from the retracted position to the extended position. In certain embodiments, the flow control vane 13, 146 may be spring biased via one or more springs in the upstream direction 169 away from the recess 166, wherein the normal flow of the exhaust gas in the downstream direction overcomes the spring force to move the flow control vane 13 in the downstream direction from the extended position to the retracted position (e.g., during normal full load, steady state condition of the turbine system 10), wherein a low flow and/or reversed flow of the exhaust gas is insufficient to overcome the spring force and thus allows the spring force to move the flow control vane 13 in the upstream direction 169 from the retracted position to the extended position.

Each set of flow control vanes 13 (e.g., 140, 142, 144, and 146) is configured to move between the retracted and extended positions relative to the wall 151 via active control by the actuators 70 and controller 60 and/or passive control (e.g., responsive to flow conditions, such as low flow and/or reversed flow of the exhaust gas, biasing movement of the flow control vanes 13). In certain embodiments, the actuators 70 (e.g., actuator assembly) may be configured to actuate the flow control vanes 13 to extend or retract in response to receiving instructions (e.g., a signal) from the controller 60. In certain embodiments, the controller 60 may be configured to instruct the actuators 70 based on one or more operating conditions of the exhaust section 24 (e.g., low flow and/or reversed flow of the exhaust gas), operating conditions of the turbine system 10 (e.g., full-load condition, part-load condition, steady state condition, transient condition, etc.). For example, the controller 60 may be configured to instruct the actuators 70 to extend the flow control vanes 13 in response to a speed of the gas turbine engine 12 being reduced to a part speed (e.g., a lower speed in a part-load condition) and may be configured to instruct the actuator 70 to retract the flow control vanes 13 in response to the gas turbine engine 12 operating in a full speed (e.g., full speed in a full-load condition). Additionally, or alternatively, the flow control vanes 13 may be passively actuated and/or manually actuated (e.g., via operator input).

In certain embodiments, any embodiment related to extending the flow control vanes 13 (e.g., linear extension, rotation about pivot, axial movement) may be used alone or in combination with other embodiments. It should be understood that these embodiments may apply to each of the inner flow control vanes 13 (e.g., 92, 132) and the outer flow control vanes 13 (e.g., 94, 95). In certain embodiments, one embodiment of extending the flow control vanes 13 (e.g.,

140, 142, 144, and 146) may be employed in one location, and another embodiment of extending the flow control vanes 13 (e.g., 140, 142, 144, and 146) may be used in another location. For example, the inner flow control vanes may each rotate about a pivot, whereas the outer flow control vanes may linearly extend from a recess.

Figure 5:
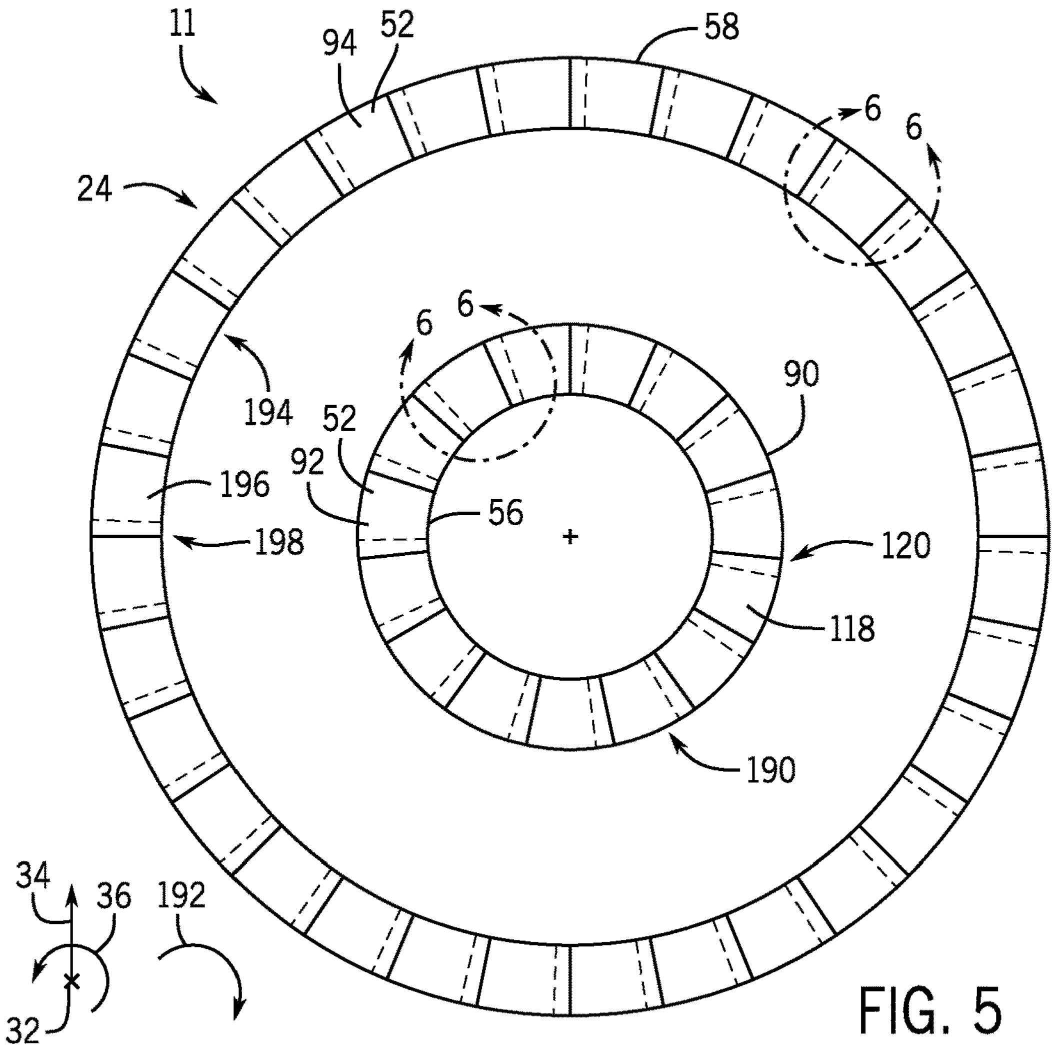
FIG. 5 is a cross-sectional view of an embodiment of the exhaust section of FIG. 2 sectioned through the radial axis, further illustrating flow control vanes of the recirculation blockage system on an inner exhaust wall and an outer exhaust wall.

FIG. 5 is a cross-sectional view of an embodiment of the gas turbine engine 12 of FIG. 2 sectioned through the radial axis 34, illustrating flow control vanes 13 of the recirculation blockage system 11 on the inner exhaust wall 56 and the outer exhaust wall 58 of the turbine section 22 (e.g., last turbine stage 74) and/or the exhaust section 24. In the illustrated embodiment, the flow control vanes 13 include a plurality of inner flow control vanes 92 disposed in a circumferential arrangement about the longitudinal axis 32. The plurality of inner flow control vanes 92 is axially aligned at a common axial position (e.g., relative to the longitudinal axis 32) along the inner exhaust wall 78, 56 (e.g., inner diameter) of the turbine section 22 and/or the exhaust section 24, respectively, to form an inner dam 190 (e.g., segmented inner dam, segmented inner ring).

As shown, the upstream surface 118 and the downstream surface 120 (e.g., axial faces) of each inner flow control vane 92 are configured to circumferentially overlap (e.g., abut) with adjacent upstream surfaces 118 and adjacent downstream surfaces 120 (e.g., adjacent axial faces) of adjacent inner flow control vanes 92 while the inner flow control vanes 92 are in an extended position. In certain embodiments, each inner flow control vane 92 may partially circumferentially 36 lap (e.g., underlap) its downstream surface 120 beneath the upstream surface 118 of a first adjacent inner flow control vane 92 and partially circumferentially 36 lap (e.g., overlap) its upstream surface 118 over the downstream surface 120 of a second adjacent inner flow control vane 92, wherein the first and second inner flow control vanes 92 are disposed on circumferentially opposite sides of the respective inner flow control vane 92. For example, the first and second inner flow control vanes 92 may be disposed on circumferentially opposite sides of the respective inner flow control vane 92 in opposite clockwise and counterclockwise directions or in opposite counterclockwise and clockwise directions to define the overlap and/or underlap of the upstream and downstream surfaces 118 and 120.

In certain embodiments, if the exhaust flow has a tangential flow in the circumferential direction 36 and a reversed flow in the upstream direction 169, then the flow control vanes 92 may be configured to overlap the upstream surfaces 120 with the downstream surfaces 118 in the same circumferential direction 36 (e.g., clockwise or counterclockwise) as the tangential flow to help block the reversed flow in the upstream direction 169. In other words, each pair of adjacent inner flow control vanes 92 overlaps the upstream and downstream surfaces 118 and 120 along an overlapping region oriented opposite to the circumferential direction 36 of the tangential flow (see FIG. 8), thereby blocking leakage of the exhaust flow in the upstream direction 169. In other words, the aforementioned direction of overlap of the inner flow control vanes 92 may be based on the circumferential direction 36 of flow (e.g., tangential flow) within the exhaust flow path 90 (e.g., direction of overlap opposite the direction of tangential flow within the exhaust flow path 90).

For example, if the exhaust flow path 90 has a counterclockwise tangential flow in the reversed flow (e.g., upstream direction 169), then each inner flow control vane 92 may be configured to overlap the adjacent inner flow control vane 92 in the clockwise direction 192. Because the direction of overlapping is opposite of the direction of tangential flow within the exhaust flow path 90, the reversed flow of the exhaust gas will flow over the overlapping of the inner flow control vanes 92, rather than flow into the crevices formed by the overlapping inner flow control vanes 92. However, the inner flow control vanes 92 may overlap circumferentially opposite sides with adjacent first and second inner flow control vanes 92 in any manner suitable to help block the reversed flow of exhaust gas. In certain embodiments, the inner flow control vanes 92 may be passively actuated, actively actuated, or manually actuated (e.g., actuated upon user input).

In the illustrated embodiment, the flow control vanes 13 include a plurality of outer flow control vanes 94 disposed in a circumferential arrangement about the longitudinal axis 32. The plurality of outer flow control vanes 94 are axially aligned at a common axial position (e.g., relative to the longitudinal axis 32) along the outer exhaust wall 58 (e.g., outer diameter) to form an outer dam 194 (e.g., segmented outer dam, segmented outer ring). As shown, an upstream surface 196 and a downstream surface 198 (e.g., axial faces) of each outer flow control vane 94 are configured to circumferentially overlap with adjacent upstream surfaces 196 and adjacent downstream surfaces 198 (e.g., adjacent axial faces) of adjacent outer flow control vanes 94 while the outer flow control vanes 94 are in an extended position. The circumferential overlap of the outer flow control vanes 94 is substantially the same as discussed in detail above with reference to the inner flow control vanes 92. In certain embodiments, the direction of the overlapping of the outer flow control vanes 94 may be opposite of the circumferential component of the flow of the exhaust flow path 90, as discussed in detail above with reference to the inner flow control vanes 92. In certain embodiments, the outer flow control vanes 94 may be passively actuated, actively actuated, or manually actuated (e.g., actuated upon user input).

Additionally, the flow control vanes 13 may include a plurality of flow control vanes (e.g., inner flow control vanes 132, outer flow control vanes 95) axially disposed between the blades and the vanes of the turbine section 22 in the last turbine stage 74. The plurality of flow control vanes 13 (e.g., 132) may be axially aligned at a first common axial position (e.g., relative to the longitudinal axis 32) along the inner exhaust wall 56 (e.g. inner diameter) to form an inner dam, and the plurality of flow control vanes 13 (e.g., 95) may be axially aligned at a second common axial position (e.g., relative to the longitudinal axis 32) along the outer exhaust wall 58 (e.g., outer diameter) to form an outer dam, respectively. The first common axial position may or may not be the same as the second common axial position. The circumferential overlap of the flow control vanes 13 (e.g., 95, 132) is substantially the same as discussed in detail above with reference to the inner flow control vanes 92. In certain embodiments, the direction of the overlapping of the flow control vanes 13 (e.g., 95, 132) may be opposite of the circumferential component of the flow of the exhaust flow path 90 as discussed in detail above.

Although the illustrated embodiment shows fifteen flow control vanes 13 disposed along the inner exhaust wall 56 and thirty-two flow control vanes 13 disposed along the outer exhaust wall 58, it should be understood that any number of flow control vanes 13 may be disposed on the inner exhaust wall 56, the outer exhaust wall 58, or between the blades and the vanes of the turbine section 22 (e.g., last turbine stage 74). For example, at least 5, 10, 15, 30, 50, or 100 flow control vanes 13 may be disposed on the inner exhaust wall 56, the outer exhaust wall 58, or between the blades and the vanes of the turbine section 22 (e.g., last turbine stage 74).

Figure 6:
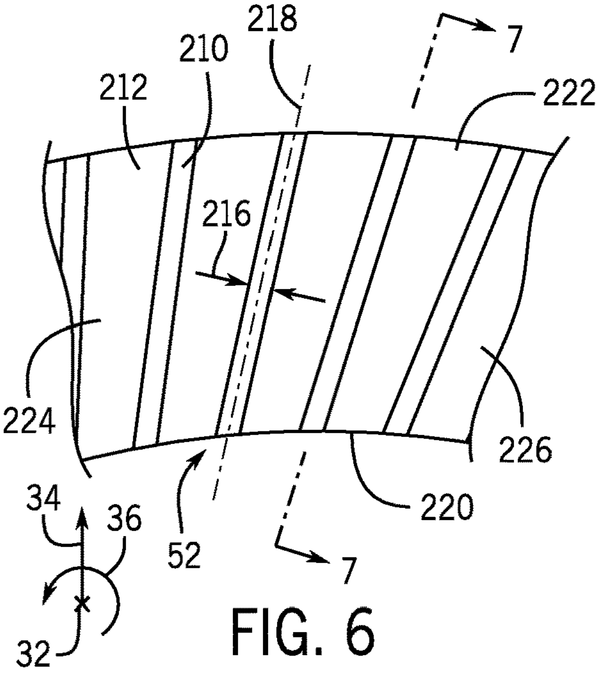
FIG. 6 is a rear view of an embodiment of a flow control vane of FIG. 5 taken within line 6-6, illustrating swirl vanes on a downstream face of the flow control vane.

FIG. 6 is a cross-sectional rear view of an embodiment of a flow control vane 13 (e.g., 92, 94, 95, 132) of FIG. 5 taken within line 6-6, illustrating swirl vanes 210 on a downstream surface 212 of the flow control vane 13. In the illustrated embodiment, the swirl vanes 210 are circumferentially angled (e.g., in the circumferential direction 36) relative to the radial direction 34 and are configured to induce a circumferential swirl in a flow of exhaust gas in the exhaust flow path. In certain embodiments, the direction in which the swirl vanes 210 are angled may be based on a location of the flow control vane 13. For example, in certain embodiments, the inner flow control vanes 13 (e.g., 92) and/or the outer flow control vanes 13 (e.g., 94) located downstream of the last stage blades 54 may include swirl vanes 210 angled in the same circumferential direction as the circumferential velocity component (e.g., tangential flow) of the reversed flow (e.g., upstream direction 169) in the exhaust flow path. That is, if the exhaust flow path has a circumferential velocity component (e.g., tangential flow) in the circumferential direction 36 (e.g., clockwise or counterclockwise direction), the swirl vanes 210 may be angled in the same circumferential direction 36 in order to increase the tangential velocity (e.g., velocity in direction of shaft rotation) of the reversed flow in the exhaust flow path. It may be appreciated that by increasing the tangential velocity of the reversed flow in the exhaust flow path, the velocity gradient of the shear layer of the exhaust flow path located after the last stage blade may be reduced to help reduce or prevent the possibility of forming rotating stall cells in the last turbine stage 74.

In certain embodiments, the inner flow control vanes 13 (e.g., 132) and/or the outer flow control vanes 13 (e.g., 95) disposed in the turbine section 22 (e.g., last turbine stage 74) may include swirl vanes 210 angled in the opposite circumferential direction as the circumferential velocity component (e.g., tangential flow) of the exhaust flow path. That is, if the exhaust flow path has a circumferential velocity component (e.g., tangential flow) in the circumferential direction 36 (e.g., clockwise or counterclockwise direction), the swirl vanes 210 may be angled in the opposite circumferential direction 36 (e.g., counterclockwise or clockwise direction) in order to decrease the tangential velocity (e.g., velocity in direction of shaft rotation) of the reversed flow of the exhaust flow path before it engages the downstream (e.g., trailing) edge of the last stage vanes 108. In certain embodiments, it may be desirable to reverse the tangential (e.g., circumferential) component of the reversed flow of the exhaust flow path slightly, so that the reversed flow more closely aligns with a shape (e.g., airfoil shape) of the last stage vanes 108.

In the illustrated embodiment, the swirl vane 210 is shown as having a constant thickness 216 along a central axis 218 of the swirl vane 210. In certain embodiments, the thickness 216 of the swirl vane 210 may change along the central axis 218. For example, the thickness 216 may increase or decrease from an inner radius 220 (e.g., radially inner side) to an outer radius 222 (e.g., radially outer side) of the flow control vane 13. Additionally, an increase or decrease of the thickness 216 may be linear, curved, and/or piecewise. In certain embodiments, the swirl vanes 210 may include protrusions and/or recesses relative to the downstream surface 212 of the flow control vane 13.

In certain embodiments, the swirl vanes 210 may fold down into a recess disposed in the downstream surface 212 of the flow control vane 13. In certain embodiments, the swirl vanes 210 may be used on all flow control vanes 13 or a combination of flow control vanes 13. In certain embodiments, the swirl vanes 210 may be configured to extend in response to receiving instructions (e.g., a signal) from the controller 60 via an actuator (e.g., electric actuator, pneumatic actuator, or hydraulic actuator). In certain embodiments, the controller 60 may be configured to instruct the actuator based on one or more operating conditions of the turbine system 10. For example, the controller 60 may be configured to instruct the actuator to extend the swirl vanes 210 in response to a speed of the gas turbine engine being reduced to a part speed (e.g., a lower speed in a part-load condition) and may be configured to instruct the actuator to retract the swirl vanes 210 in response to the gas turbine engine operating in a full speed (e.g., full speed in a full-load condition). Additionally, or alternatively, the flow control vane 13 may be passively actuated and/or manually actuated (e.g., via operator input).

As illustrated in FIG. 6, the flow control vane 13 has circumferentially opposite sides 224 and 226, which are configured to overlap with adjacent flow control vanes 13 as discussed above with reference to FIG. 6. For example, the side 224 of the illustrated flow control vane 13 overlaps with the side 226 of a first adjacent flow control vane 13, while the side 226 of the illustrated flow control vane 13 overlaps with the side 224 of a second adjacent flow control vane 13. The circumferential overlap of the adjacent sides 224, 226 extends from the inner radius 220 to the outer radius 222, wherein the circumferential overlap is between the upstream and downstream surfaces of the adjacent flow control vanes 13. In certain embodiments, the circumferential overlap between the adjacent flow control vanes 13 may be at least partially angled as discussed below with reference to FIG. 8.

Figure 7:
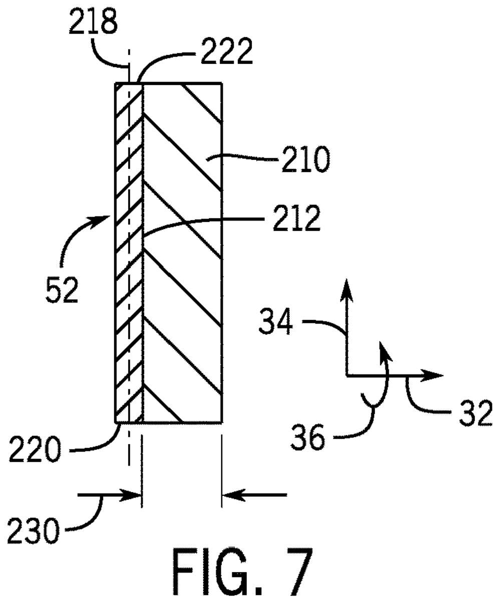
FIG. 7 is a cross-sectional side view of an embodiment of the flow control vane of FIG. 5 taken along line 7-7 of FIG. 6, illustrating one of the swirl vanes protruding from the downstream face of the flow control vane.

FIG. 7 is a cross-sectional side view of an embodiment of the flow control vane 13 of FIG. 5 taken along line 7-7 of FIG. 6, illustrating one of the swirl vanes 210 protruding from the downstream surface 212 of the flow control vane 13. In the illustrated embodiment, the swirl vane 210 axially extends in the longitudinal direction 32 from the downstream surface 212. In the illustrated embodiment, a height 230 of the swirl vane 210 is constant along the direction of the central axis 218 of the swirl vane 210. In certain embodiments, the height 230 of the swirl vane 210 may vary along the central axis 218 of the swirl vane 210. For example, the height 230 may increase and/or decrease from the inner radius 220 to the outer radius 222 of the flow control vane 13. Additionally, an increase and/or decrease of the height 230 of the swirl vane 210 may be linear, curved, and/or piecewise.

Figure 8:
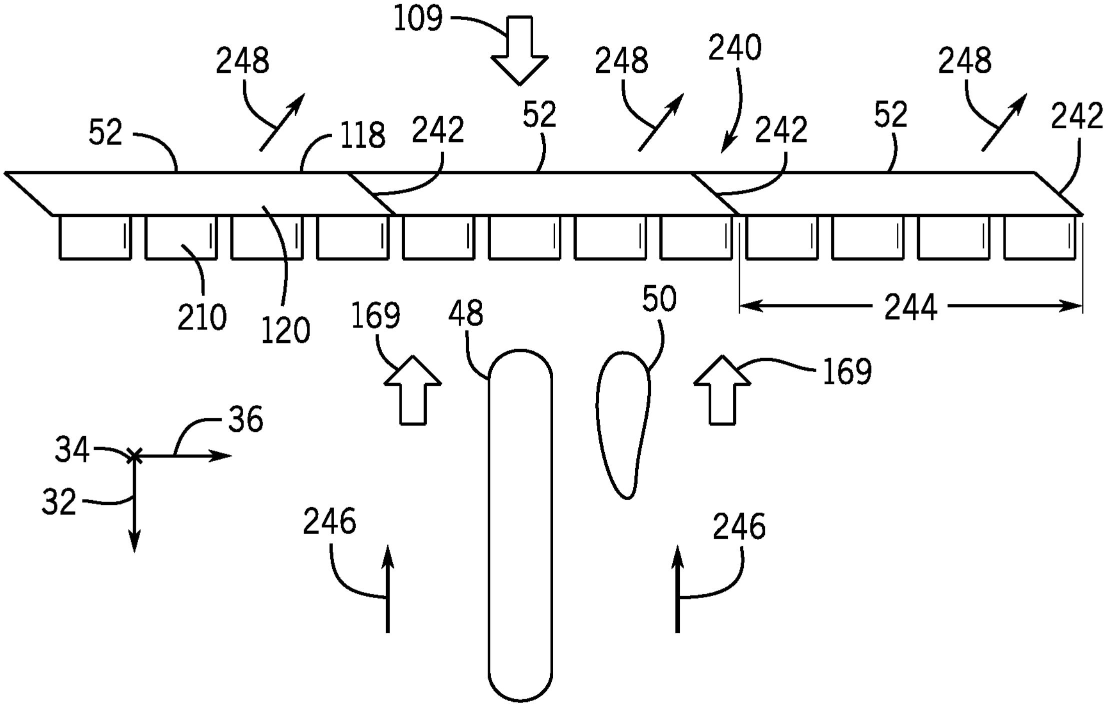
FIG. 8 is a top view of an embodiment of the flow control vanes of FIGS. 2-7, illustrating the flow control vanes abutting in a circumferential direction to define a segmented annular dam.

FIG. 8 is a top view of an embodiment of the flow control vanes 13 of FIGS. 2-7, illustrating a portion (e.g., three) of a set of the flow control vanes 13 abutting in a circumferential direction 36 to define a segmented annular dam 240 (e.g., inner dam, outer dam). In the illustrated embodiment, the flow control vanes 13 are illustrated as having diagonal sides 242 (e.g., angled sides 224, 226) that overlap (e.g., abut, extend over, or extend beneath) adjacent flow control vanes 13. For example, the angled sides 242 may be oriented at an angle relative to the longitudinal axis 32, wherein the angle is between 10 to 80 degrees, 20 to 70 degrees, 30 to 60 degrees, or 40 to 50 degrees. In certain embodiments, the upstream surface 118 and downstream surface 120 of each flow control vane 13 may partially overlap the upstream surface 118 or downstream surface 120 of an adjacent flow control vane 13, as discussed herein. In the illustrated embodiment, the swirl vanes 210 extend across a circumferential dimension 244 (e.g., width) of each flow control vane 13. In certain embodiments, the swirl vanes 210 may extend across a portion of the circumferential dimension 244 to provide space for overlapping of upstream surfaces 118 and downstream surfaces 120 of adjacent flow control vanes 13.

In the illustrated embodiment, the flow control vanes 13 are disposed axially upstream of the struts 48 and the auxiliary struts 50 relative to the downstream flow direction 109 of exhaust gas from the turbine section 22 through the exhaust section 24. Although one strut 48 and one auxiliary strut 50 are shown for simplicity in FIG. 8, the exhaust section 24 may include any number of struts 48 and auxiliary struts 50 in a circumferential arrangement about the longitudinal axis 32. In certain operating conditions of the turbine system 10, the exhaust gas may experience a low flow condition and/or a reversed flow condition (i.e., in the upstream direction 169 opposite the downstream flow direction 109). For example, the low flow condition and/or reversed flow condition may result from operation of the turbine system 10 in a part-load condition, a transient condition (e.g., startup, shutdown, or other variable operation), or any other condition of the turbine system 10 resulting in a low flow through the turbine section 22 and the exhaust section 24. The reversed flow condition may include a reversed flow of the exhaust gas between the struts 48 and the auxiliary struts 50 as indicated by arrow 246.

The reversed flow 246 may be substantially aligned with the longitudinal axis 32 in the upstream direction 169, such that the reversed flow 246 is substantially free of circumferential flow (e.g., tangential flow) in the circumferential direction 36 in the region downstream from the flow control vanes 13 (e.g., segmented annular dam 240). However, the reversed flow 246 may include some circumferential flow. In response to contacting the swirl vanes 210 disposed on the downstream surface 120 of the flow control vanes 13 (e.g., segmented annular dam 240), the reversed flow 246 of exhaust gas is substantially directed (e.g., swirled) in the circumferential direction 36 to achieve and/or increase a circumferential flow (e.g., tangential flow) upstream of the flow control vanes 13 (e.g., segmented annular dam 240) as indicated by arrows 248. In certain embodiments, the swirl vanes 210 are angled in the same circumferential direction 36 as the rotational direction of the last stage blades 54 of the last turbine stage 74, thereby helping to reduce a velocity gradient between the reversed flow 246, 248 and the last stage blades 54. The reduced velocity gradient in turn helps to reduce the possibility of rotating stall cells forming in the last turbine stage 74.

Although the illustrated embodiment shows four swirl vanes 210 disposed on the downstream surface 120 of each flow control vane 13, any number of swirl vanes 210 may be disposed on the downstream surface 120 of each flow control vane 13. For example, at least 2, 4, 8, 10, or 20 swirl vanes 210 may be disposed on the downstream surface 120 of each flow control vane 13. Additionally, the number of swirl vanes 210 disposed on the downstream surface 120 of each flow control vane 13 may vary from one flow control vane 13 to another and/or from one set of flow control vanes 13 to another.

Figure 9:
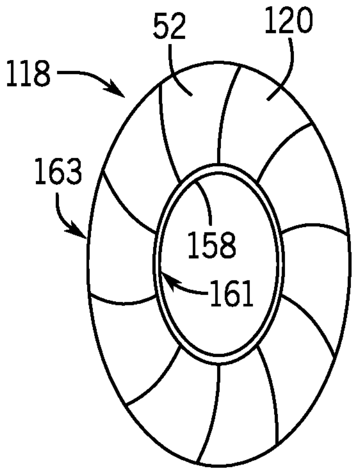
FIG. 9 is a perspective view of an embodiment of a set of flow control vanes of FIGS. 2-5 in an extended position (e.g., unfolded configuration), wherein each of the flow control vanes comprises a curved vane, and the flow control vanes collectively define a curved annular dam.

FIG. 9 is a perspective view of an embodiment of a set of the flow control vanes 13 of FIGS. 2-5 in an extended position (e.g., unfolded configuration), wherein each of the flow control vanes 13 comprises a curved vane, and the flow control vanes 13 collectively define a curved annular dam. For example, each of the flow control vanes 13 may be radially curved (e.g., curved in the radial direction 34), circumferentially curved (e.g., curved in the circumferential direction 36), and/or axially curved (e.g., curved in the axial direction 32). The curved shape of the flow control vanes 13 is configured to enable folding and unfolding of the flow control vanes 13 between the retracted and extended positions, while enabling the flow control vanes 13 to smoothly slide along one another. In the illustrated embodiment, the upstream surface 118 and the downstream surface 120 of each flow control vane 13 are configured to overlap the adjacent upstream surface 118 and downstream surface 120 of adjacent flow control vanes 13 while in the extended position. As shown, the flow control vanes 13 are configured to rotate about pivots 158 (e.g., pivot joints, rotational joints, or hinges). In the illustrated embodiment, the pivots 158 are disposed at an upstream end 161 of the flow control vanes 13. In certain embodiments, the pivots 158 are disposed at a downstream end 163 of the flow control vanes 13. Although the illustrated embodiment shows the inner flow control vanes 13 (e.g., 92, 132), the embodiment may be used for flow control vanes 13 located elsewhere (e.g., outer flow control vanes 94, 95).

Figure 10:
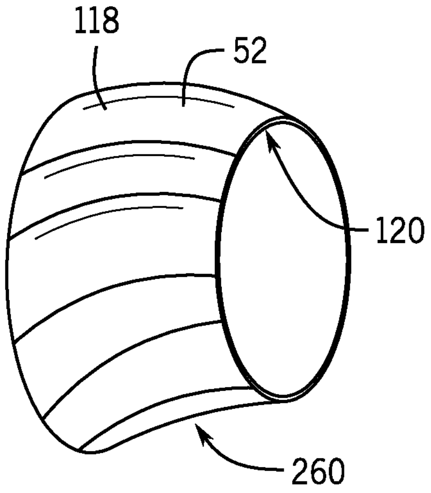
FIG. 10 is a perspective view of an embodiment of the set of flow control vanes of FIGS. 5 and 9 in a retracted position (e.g., folded configuration)

FIG. 10 is a perspective view of an embodiment of the set of flow control vanes 13 of FIGS. 5 and 9 in a retracted position (e.g., folded configuration). In the illustrated embodiment, the upstream surface 118 and the downstream surface 120 of each flow control vane 13 are configured to slide past (e.g., slide over) the adjacent upstream surface 118 and downstream surface 120 of adjacent flow control vanes 13 in order to transition from the extended position of FIG. 9 to the retracted position of FIG. 10. As shown, a radially outward side 260 of the flow control vanes 13 has a curved annular shape configured to provide a substantially smooth surface over which the exhaust gas can flow while the flow control vanes 13 are in the retracted position. For example, the curved annular shape may have a variable diameter in the longitudinal direction 32 due to the folding or retraction of the curved shapes of the set of flow control vanes 13. Although the illustrated embodiment shows the inner flow control vanes 13 (e.g., 92, 132), the embodiment may be used for flow control vanes 13 located elsewhere (e.g., outer flow control vanes 94, 95).

Figure 11:
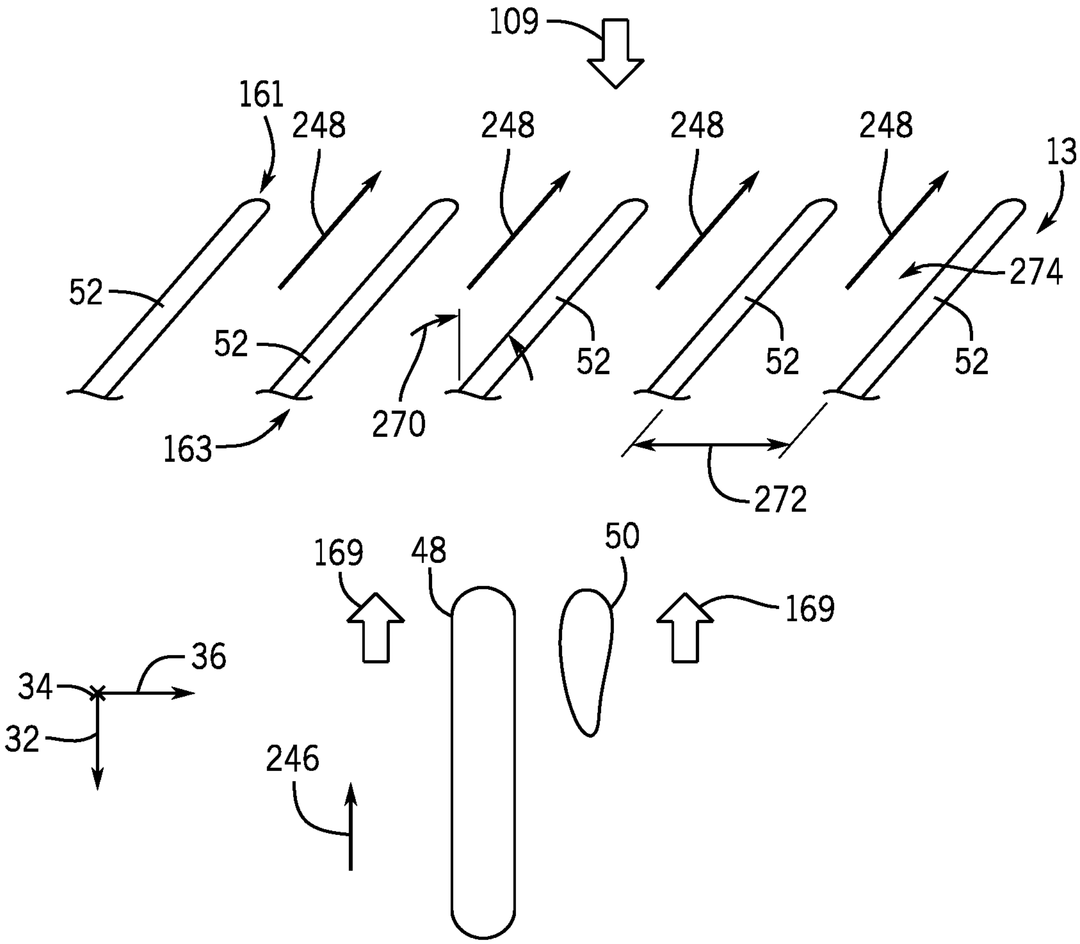
FIG. 11 is a top view of an embodiment of a set of flow control vanes of FIGS. 2-7, illustrating the flow control vanes spaced apart in the circumferential direction and angled to induce swirl.

FIG. 11 is a top view of an embodiment of a set of the flow control vanes 13 of FIGS. 2-7, illustrating the flow control vanes 13 spaced apart from one another in a circumferential arrangement about the longitudinal axis 32 of the turbine section 22 and angled relative to the longitudinal axis 32 to induce swirl (e.g., circumferential or tangential flow) on the reversed flow 246, 248 of exhaust gas in the upstream direction 169 opposite the downstream direction 109. In the illustrated embodiment, the flow control vanes 13 are oriented at an angle 270 relative to the longitudinal axis 32 in the circumferential direction 36. The angle 270 may be between 10 to 80 degrees, 20 to 70 degrees, 30 to 60 degrees, or 40 to 50 degrees. For example, the angle 270 may be less than, equal to, or greater than 10, 20, 30, 40, 50, 60, 70, or 80 degrees, plus or minus 5 or 10 degrees. Additionally, the flow control vanes 13 may be circumferentially spaced apart from one another by a circumferential spacing 272 (e.g., circumferential gap, distance, or separation). In some embodiments, the circumferential spacing 272 is a uniform spacing between all of the flow control vanes 13 in a particular set or in multiple sets of the flow control vanes 13. However, in some embodiments, the circumferential spacing 272 is a variable spacing between the flow control vanes 13 in a particular set or between different sets of the flow control vanes 13. Additionally, in certain embodiments, adjacent flow control vanes 13 at least partially circumferentially overlap one another between upstream ends 161 and downstream ends 163, where the terms "upstream" and "downstream" are relative to the flow of exhaust gas from the turbine section 22. However, each pair of adjacent flow control vanes 13 defines an intermediate flow channel 274 oriented at the angle 270 to induce swirl of the reversed flow 246, 248 of exhaust gas in the upstream direction 169.

In the illustrated embodiment, the flow control vanes 13 are disposed axially upstream of the struts 48 and the auxiliary struts 50 relative to the downstream flow direction 109 of exhaust gas from the turbine section 22 through the exhaust section 24. Although one strut 48 and one auxiliary strut 50 are shown for simplicity in FIG. 11, the exhaust section 24 may include any number of struts 48 and auxiliary struts 50 in a circumferential arrangement about the longitudinal axis 32. In certain operating conditions of the turbine system 10, the exhaust gas may experience a low flow condition and/or a reversed flow condition due to operation of the turbine system 10 in a part-load condition or a transient condition (e.g., startup, shutdown, or other variable operation). The reversed flow condition may include a reversed flow of the exhaust gas between the struts 48 and the auxiliary struts 50 as indicated by arrow 246.

The reversed flow 246 may be substantially aligned with the longitudinal axis 32 in the upstream direction 169, such that the reversed flow 246 is substantially free of circumferential flow (e.g., tangential flow) in the circumferential direction 36 in the region downstream from the flow control vanes 13 (e.g., segmented annular dam 240). However, the reversed flow 246 may include some circumferential flow. In response to contacting the angled flow control vanes 13, the reversed flow 246 of exhaust gas is substantially directed (e.g., swirled) in the circumferential direction 36 to achieve and/or increase a circumferential flow (e.g., tangential flow) upstream of the flow control vanes 13 as indicated by arrows 248. In certain embodiments, the flow control vanes 13 are angled in the same circumferential direction 36 as the rotational direction of the last stage blades 54 of the last turbine stage 74, thereby helping to reduce a velocity gradient between the reversed flow 246, 248 and the last stage blades 54. The reduced velocity gradient in turn helps to reduce the possibility of rotating stall cells forming in the last turbine stage 74. In certain embodiments, the flow control vanes 13 have an airfoil shape between the downstream end 163 (e.g., leading edge relative to the reversed flow 246) and the upstream end 161 (e.g., trailing edge relative to the reversed flow 246).

In certain embodiments, the flow control vanes 13 having the angle 270 and the circumferential spacing 272 may be applied to the inner flow control vanes 13 (e.g., 92, 132) and/or the outer flow control vanes 13 (e.g., 94, 95). In certain embodiments, a combination of flow control vane features may be used for each set of the flow control vanes 13 (e.g., 92, 94, 95, and 132), such as a combination of features shown in FIGS. 2-11. For example, one or more sets of the flow control vanes 13 of FIG. 11 may be used in combination with one or more sets of the flow control vanes 13 of FIGS. 6-8. Additionally, any of the embodiments of FIGS. 4, 9, and 10 may be used for the flow control vanes 13 in any and all configurations of the flow control vanes 13.

By further example, the inner flow control vanes 13 (e.g., 92, 132) may include swirl vanes 210 disposed on a downstream surface 212 of the inner flow control vanes 13 as illustrated in FIGS. 6-8, and the outer flow control vanes 13 (e.g., 94, 95) may include the flow control vanes 13 having the angle 270 and the circumferential spacing 272 as illustrated in FIG. 11, or vice versa. Additionally, the direction of swirl imparted by the swirl vanes 210 of FIGS. 6-8 and/or the flow control vanes 13 of FIG. 11 may be adjusted (e.g., clockwise or counterclockwise) depending on the installation location in the turbine section 22 (e.g., flow control vanes 95, 132) or the exhaust section 24 (e.g., flow control vanes 92, 94). For example, the swirl direction may be the same as the rotational direction of the turbine section 22 for the flow control vanes 13 in the exhaust section 24, whereas the swirl direction may be opposite from the rotational direction of the turbine section 22 for the flow control vanes 13 in the turbine section 22 (e.g., last turbine stage 74).

Figure 12:
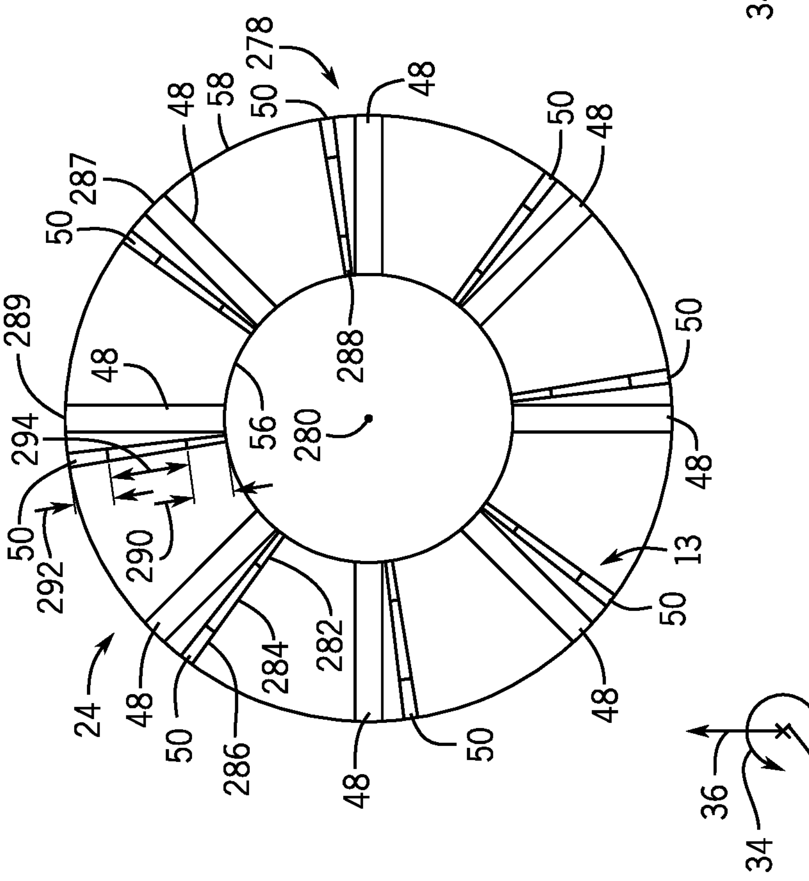
FIG. 12 is a cross-sectional view of an embodiment of a plurality of struts and a plurality of auxiliary struts, illustrating the auxiliary struts having flow control vanes in retracted positions (e.g., axially aligned positions relative to a central axis)

FIG. 12 is a cross-sectional view of an embodiment of a plurality of struts 48 and a plurality of auxiliary struts 50 (e.g., auxiliary airfoils), illustrating the auxiliary struts 50 having flow control vanes 13 in retracted positions 278 (e.g., axially aligned positions) relative to a central engine axis 280. The flow control vanes 13 are configured to provide blockage of the reversed flow of exhaust gas in substantially the same manner as discussed in detail above, albeit as part of the auxiliary struts 50. In the illustrated embodiment, the struts 48 and the auxiliary struts 50 extend radially 34 from the inner exhaust wall 56 (e.g., inner diameter) to the outer exhaust wall 58 (e.g., outer diameter). In the illustrated embodiment, the auxiliary struts 50 are circumferentially disposed (e.g., spaced or offset) between adjacent struts 48 (e.g., adjacent struts 287 and 289) of the exhaust section 24. As shown, each of the auxiliary struts 50 is substantially closer to one of the adjacent struts 48 (e.g., adjacent strut 287) of the adjacent struts 48.

In certain embodiments, each of the struts 48 and the auxiliary struts 50 has an airfoil shaped geometry, e.g., radial airfoil. As shown, the auxiliary strut 50 is segmented to include an inner portion 282, a central portion 284 disposed radially outward from the inner portion 282, an outer portion 286 disposed radially outward from the central portion 284, and one or more strut pivots 288 (e.g., pivot joints, rotational joints, or hinges) radially coupled to the inner portion 282, the outer portion 286, and, in certain embodiments, the central portion 284. In the illustrated embodiment, an inner radial extent 290 (e.g., radial length) of the inner portion 282 and an outer radial extent 292 (e.g., radial length) of the outer portion 286 are each smaller than a middle radial extent 294 (e.g., radial length) of the central portion 284. In certain embodiments, the inner radial extent 290 and the outer radial extent 292 are each equal to or larger than the middle radial extent 294.

Figure 13:
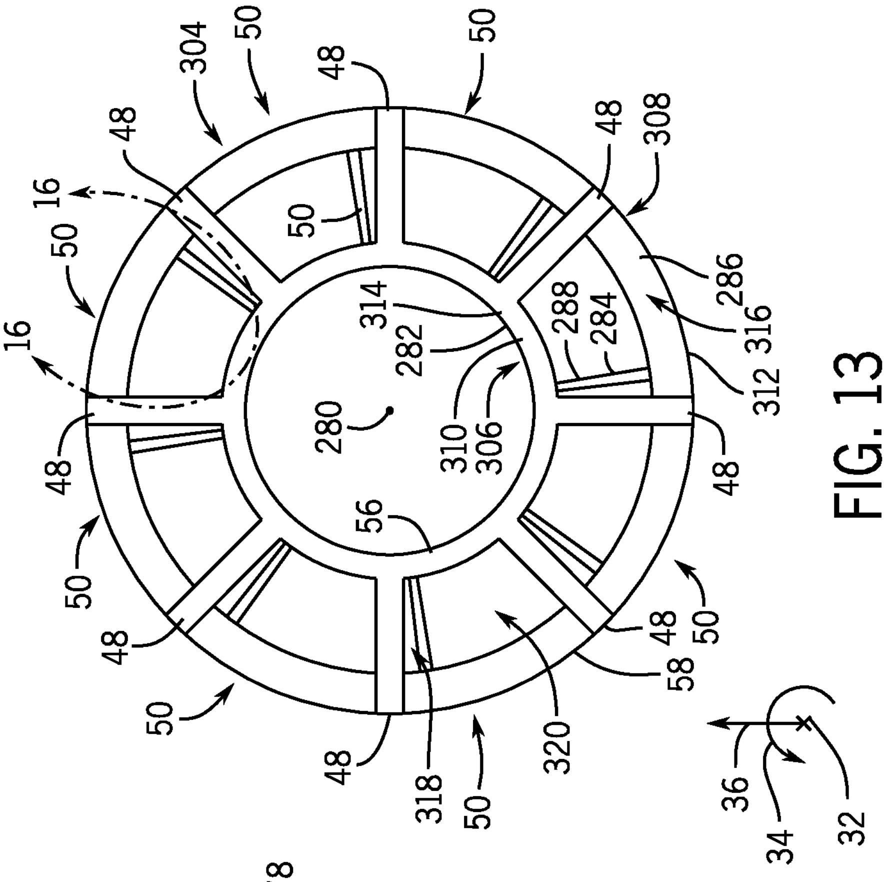
FIG. 13 is a cross-sectional view of an embodiment of the plurality of struts and the plurality of auxiliary struts of FIG. 12, illustrating the auxiliary struts having flow control vanes in extended positions (e.g., circumferentially extended, angled, or unfolded positions) relative to the central axis.
Figure 14:
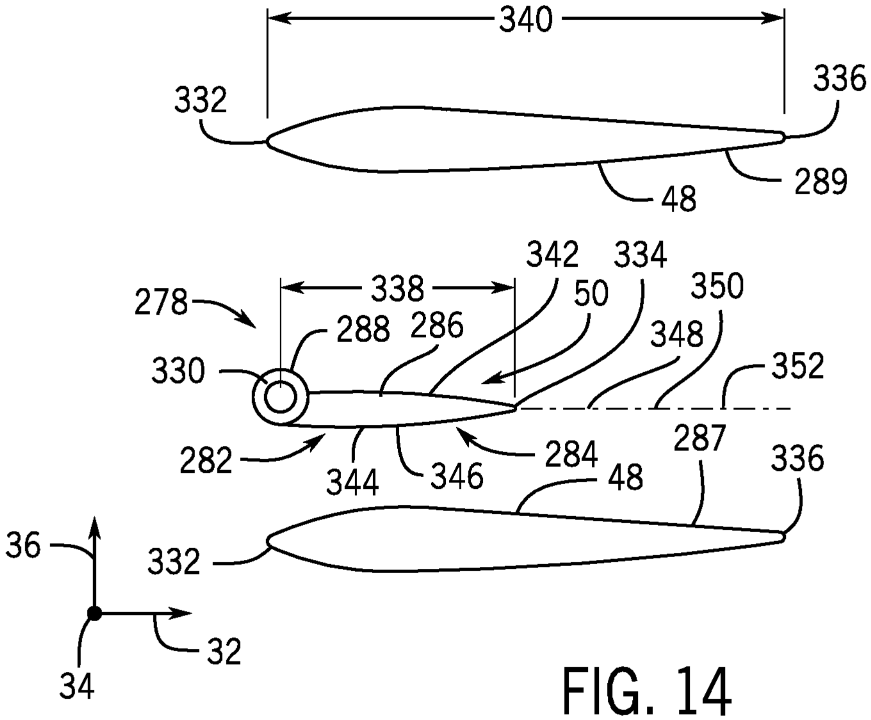
FIG. 14 is a cross-sectional view of an embodiment of an auxiliary strut between adjacent struts as illustrated in FIG. 12, further illustrating inner and outer portions (e.g., flow control vanes) of the auxiliary strut in the retracted position (e.g., in an axially aligned, parallel, or folded position)
Figure 15:
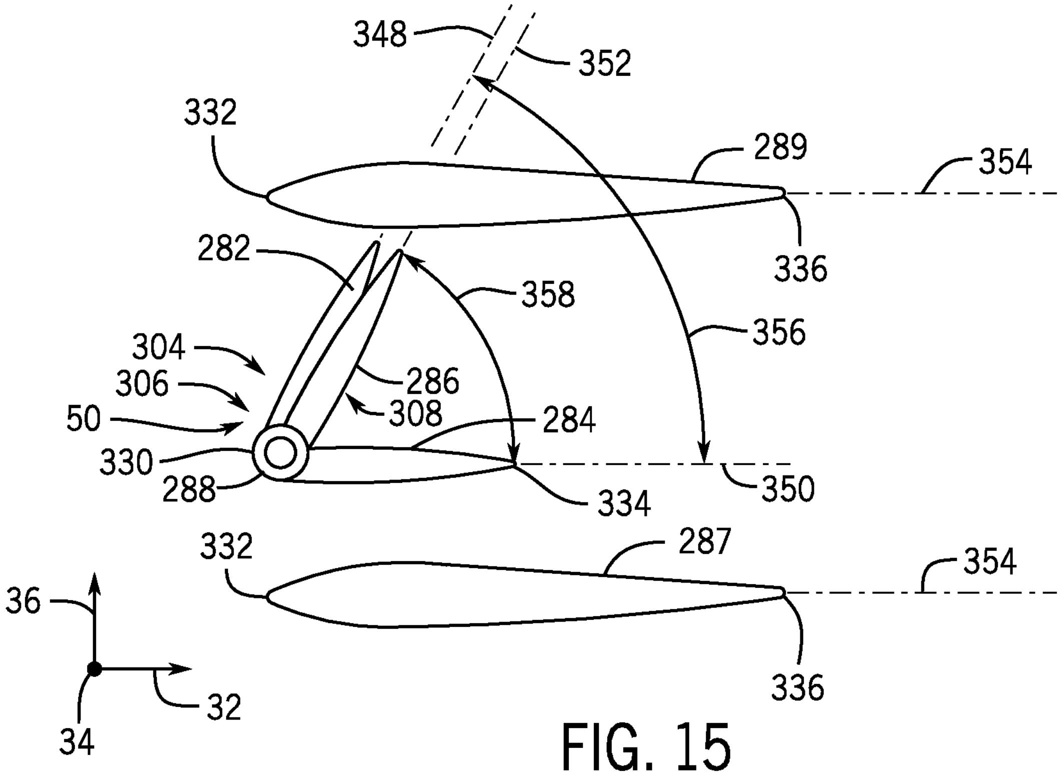
FIG. 15 is a cross-sectional view of an embodiment of an auxiliary strut between adjacent struts as illustrated in FIG. 13, further illustrating the central portion of the airfoil axially aligned with the central axis and the inner and outer portions (e.g., flow control vanes) of the auxiliary strut in the extended positions.

In certain embodiments, one or more of the inner portion 282, the central portion 284, and the outer portion 286 comprises or embodies a flow control vane 13, which is adjustable or moveable between the retracted position 278 as shown in FIGS. 12 and 14 and an extended position 304 as shown in FIGS. 13 and 15. For example, the inner and outer portions 282 and 286 of each auxiliary strut 50 may be adjustable between the retracted and extended positions 278 and 304, wherein each of the inner and outer portions 282 and 286 is aligned with the longitudinal axis 32 and the central engine axis 280 in the retracted position 278 (e.g., axially aligned, parallel, or folded position), and wherein each of the inner and outer portions 282 and 286 extends circumferentially 36 between the adjacent struts 48 (e.g., adjacent struts 287 and 289) in the extended position 304 (e.g., angled, circumferentially extended, or unfolded position).

In some embodiments, the inner and outer portions 282 and 286 of each auxiliary strut 50 (and each set of auxiliary struts 50) may be adjustable between the extended and retracted positions 278 and 304 independent from one another and/or in synchronization with one another. Additionally, the inner and outer portions 282 and 286 of each auxiliary strut 50 (and each set of auxiliary struts 50) may be adjustable to different extended positions 304, such that different amounts of circumferential coverage (e.g., flow blockage) can be achieved along the inner and outer exhaust walls 56 and 58. Accordingly, the inner and outer portions 282 and 286 of each auxiliary strut 50 (and each set of auxiliary struts 50) may be coupled to independent actuators 70 for independent control by the controller 60, or the inner and outer portions 282 and 286 of each auxiliary strut 50 (and each set of auxiliary struts 50) may be coupled to a common actuator 70 for combined control by the controller 60.

Although the illustrated embodiment shows eight struts 48 and eight auxiliary struts 50 circumferentially disposed in the exhaust section 24, any number of struts 48 and auxiliary struts 50 may be disposed in the exhaust section 24. For example, at least 2, 4, 6, 8, 10, 12, 14, 16, 18, 20 or more struts 48 and auxiliary struts 50 may be disposed in the exhaust section 24. In the illustrated embodiment, there is an equal number of auxiliary struts 50 as struts 48, with one auxiliary strut 50 disposed between every two adjacent struts 48. In certain embodiments, the number of auxiliary struts 50 may be a multiple of the number of struts 48. For example, there may at least 2, 3, or 4 auxiliary struts 50 circumferentially disposed between every two adjacent struts 48.

FIG. 13 is a cross-sectional view of an embodiment of the plurality of struts 48 and the plurality of auxiliary struts 50, illustrating the auxiliary struts 50 having flow control vanes 13 in the extended positions 304 (e.g., circumferentially extended, angled, or unfolded positions) relative to the central engine axis 280. As shown, the inner portion 282, the outer portion 286, or both are configured to rotate about the one or more strut pivots 288 from the retracted positions 278 to the extended positions 304. In the illustrated embodiment, the central portion 284 remains in a stationary position rather than rotating about the one or more strut pivots 288. As shown, the inner portion 282 is configured to substantially span (e.g., substantially block) an inner circumferential distance 310 between the adjacent struts 48 while the inner portion 282 is in an extended position 304, 306. Additionally, or alternatively, the outer portion 286 is configured to substantially span (e.g., substantially block) an outer circumferential distance 312 between the adjacent struts 48 while the outer portion 286 is in an extended position 304, 308. That is, the inner portion 282 is configured to at least substantially block (e.g., mostly block) an inner section 314 of the exhaust flow path 90 disposed directly radially outward from the inner exhaust wall 56, and the outer portion 286 is configured to at least substantially block (e.g., mostly block) an outer section 316 of the exhaust flow path 90 disposed directly radially inward from the outer exhaust wall 58.

In certain embodiments, there may be gaps 318 (FIG. 16) disposed on either circumferential side of the inner portion 282 or the outer portion 286. In the illustrated embodiment, the inner portion 282 and the outer portion 286 are configured to form an axial opening 320 radially disposed between the inner portion 282 and the outer portion 286 through which the exhaust flow path may flow. In the illustrated embodiment, the inner portion 282 and the outer portion 286 are shown as being circumferentially curved (e.g., curved in the circumferential direction 36). For example, the inner portion 282 may have a curvature (e.g., radius) matched with or substantially conformed with a curvature (e.g., radius) of the inner exhaust wall 56, and the outer portion 286 may have a curvature (e.g., radius) matched with or substantially conformed with a curvature (e.g., radius) of the outer exhaust wall 58. In certain embodiments, the inner portion 282 and the outer portion 286 may be substantially linear (e.g., straight, flat) along the circumferential direction 36.

FIG. 14 is a cross-sectional view of an embodiment of an auxiliary strut 50 circumferentially disposed between adjacent struts 48 as illustrated in FIG. 12, further illustrating the inner portion 282 and the outer portion 286 of the auxiliary strut 48 in the retracted position 278 (e.g., axially aligned, parallel, or folded position). Each auxiliary strut 50 has an upstream or leading edge 330 and a downstream or trailing edge 334, and each strut 48 has an upstream or leading edge 332 and a downstream or trailing edge 336. In the illustrated embodiment, the leading edge 330 of the auxiliary strut 50 is axially aligned with the leading edges 332 of adjacent struts 48 (e.g., adjacent struts 287 and 289). For example, the leading edges 330, 332 may be at a common axial position along the longitudinal axis 32 and the central engine axis 280. In some embodiments, the leading edges 330 of the auxiliary struts 50 may be upstream and/or downstream from the leading edges 332 of the struts 48. However, at least a portion of the auxiliary struts 50 is disposed downstream from the leading edges 332 of the struts 48. As shown, the inner portion 282, the central portion 284, the outer portion 286, and at least a portion of the one or more strut pivots 288 are disposed downstream of the adjacent leading edges 332 of the struts 48 (e.g., adjacent struts 287 and 289).

In the illustrated embodiment, the auxiliary strut 50 is shown as having an airfoil shape, with the leading edge 330 of the auxiliary strut 50 being disposed upstream of the trailing edge 334. In certain embodiments, the auxiliary strut 50 may have a rectangular shape, an elliptical shape, a polygonal shape, or an irregular curved shape. In the illustrated embodiment, the auxiliary strut 50 has an axial length 338 (e.g., from leading edge 330 to trailing edge 334) that is shorter than an axial length 340 (e.g., from leading edge 332 to trailing edge 336) of the adjacent struts 48 (e.g., adjacent struts 287 and 289). In certain embodiments, the axial length 338 may be substantially equivalent to the axial length 340 of the adjacent struts 48 (e.g., adjacent struts 287 and 289).

In the illustrated embodiment, the inner portion 282, the central portion 284, and the outer portion 286 have a substantially equivalent axial length 338. In certain embodiments, the axial lengths 338 of the inner portion 282, the central portion 284, and the outer portion 286 may be different from one another. In certain embodiments, the axial lengths 338 of the inner portion 282, the central portion 284, and/or the outer portion 286 of each auxiliary strut 50 may be less than, equal to, or greater than the axial length 340 of the struts 48. For example, each axial length 338 may be between 10 to 90 percent, 20 to 80 percent, 30 to 70 percent, or 40 to 60 percent of the axial length 340 of the struts 48. By further example, the axial lengths 338 may be less than or equal to approximately 10, 20, 30, 40, 50, 60, or 70 percent (plus or minus 5 or 10 percent) of the axial length 340.

In the illustrated embodiment, a profile 342 (e.g., inner profile, perimeter, or airfoil section) of the inner portion 282, a profile 344 (e.g., central profile, perimeter, or airfoil section) of the central portion 284, and a profile 346 (e.g., outer profile, perimeter, or airfoil section) of the outer portion 286 are configured to radially align (e.g., along the radial direction 34) with each other when the inner portion 282 and the outer portion 286 are in the retracted position

278. That is, in the illustrated embodiment, the profile 342 is substantially equivalent to the profiles 344 and 346. In certain embodiments, the profiles 342, 344, 346 may not be equivalent in shape and/or size. As shown, an inner longitudinal axis 348 of the inner portion 282, a central longitudinal axis 350 of the central portion 284, and an outer longitudinal axis 352 of the outer portion 286 are each substantially co-axial (e.g., aligned) and parallel to corresponding longitudinal axes 354 of the adjacent struts 48 (e.g., adjacent struts 287 and 289) when the inner portion 282, the central portion 284, and the outer portion 286 are each in the retracted position 278 (e.g., axially aligned position). However, in the retracted position 278, the axes 348, 350, 352 of each auxiliary strut 50 may be aligned with one another and a first radius defined through the auxiliary strut 50 between the central engine axis 280 and the outer exhaust wall 58, whereas the axis 354 of each strut 48 may be aligned with a second radius circumferentially 36 offset from the first radius, the second radius being defined through the strut 48 between the central engine axis 280 and the exhaust wall 58. Accordingly, the first and second radii may not be exactly parallel with one another.

FIG. 15 is a cross-sectional view of an embodiment of an auxiliary strut 50 between adjacent struts 48 (e.g., adjacent struts 287 and 289) as illustrated in FIG. 13, further illustrating the central portion 284 of the auxiliary strut 50 axially aligned with the longitudinal axis 32 and the central engine axis 280 and the inner portion 282 and the outer portion 286 in the extended positions 304. As shown, an inner longitudinal axis 348 of the inner portion 282 and an outer longitudinal axis 352 of the outer portion 286 are angled relative to corresponding longitudinal axes 354 of the adjacent struts 48 (e.g., adjacent struts 287 and 289) when the inner portion 282 and the outer portion 286 are each in the extended position 304.

In certain embodiments, an inner angle 356 is defined between the inner longitudinal axis 348 of the inner portion 282 and the central longitudinal axis 350 of the central portion 284, which is different than an outer angle 358 defined between the outer longitudinal axis 352 of the outer portion 286 and the central longitudinal axis 350 of the central portion 284. For example, the inner angle 356 may be greater or less than the outer angle 358. That is, in certain embodiments, the extended position 306 of the inner portion 282 may be angularly different than the extended position 308 of the outer portion 286.

In certain embodiments, the inner angle 356 between the inner longitudinal axis 348 of the inner portion 282 and the central longitudinal axis 350 of the central portion 284 is substantially equivalent to the outer angle 358 between the outer longitudinal axis 352 of the outer portion 286 and the central longitudinal axis 350 of the central portion 284. That is, in certain embodiments, the extended position 306 of the inner portion 282 may be substantially equivalent to the extended position 308 of the outer portion 286. The inner angle 356 and the outer angle 358 may each range between 10 to 90 degrees, 20 to 80 degrees, 30 to 70 degrees, or 40 to 60 degrees.

In certain embodiments, the controller 60 may control one or more actuators 70 to adjust the inner angle 356 and the outer angle 358 in a continuously variable or stepwise manner (e.g., continuous or incremental angular changes) to be the same or different from one another. In certain embodiments, the controller 60 may control one or more actuators 70 to move the inner portion 282 from the retracted position 278 to the extended position 304, while holding the outer portion 286 in retracted position 278 or while moving the outer portion 286 from the extended position 304 to the retracted position 278, or vice versa. In certain embodiments, the inner angle 356 and/or the outer angle 358 may be based on one or more operating conditions of the gas turbine engine. For example, the inner angle 356 and/or the outer angle 358 may vary based on a low flow and/or reversed flow condition in the exhaust section 24, an operating condition of the turbine system 10 (e.g., part-load, full-load, steady state, transient (e.g., startup or shutdown), or any combination thereof).

In certain embodiments, the inner portion 282 and the outer portion 286 may be configured to rotate concurrently about the one or more strut pivots 288 (e.g., equivalent kinematic trajectories). That is, the inner longitudinal axis 348 of the inner portion 282 and the outer longitudinal axis 352 of the outer portion 286 are configured to radially align during a rotation of the inner portion 282 and the outer portion 286.

In certain embodiments, the inner portion 282 and the outer portion 286 may be configured to rotate non-concurrently (e.g., non-synchronously). For example, the inner portion 282 may be configured to rotate from the retracted position 278 (e.g., axially aligned position) to the extended position 304 before or after the outer portion 286 rotates from the retracted position 278 (e.g., axially aligned position) to the extended position 304. In certain embodiments, the inner portion 282 and the outer portion 286 are configured to rotate about one or more strut pivots 288 independently from each other. For example, the inner portion 282 may or may not be internally coupled (e.g., through the one or more strut pivots 288) to the outer portion 286.

Figure 16:
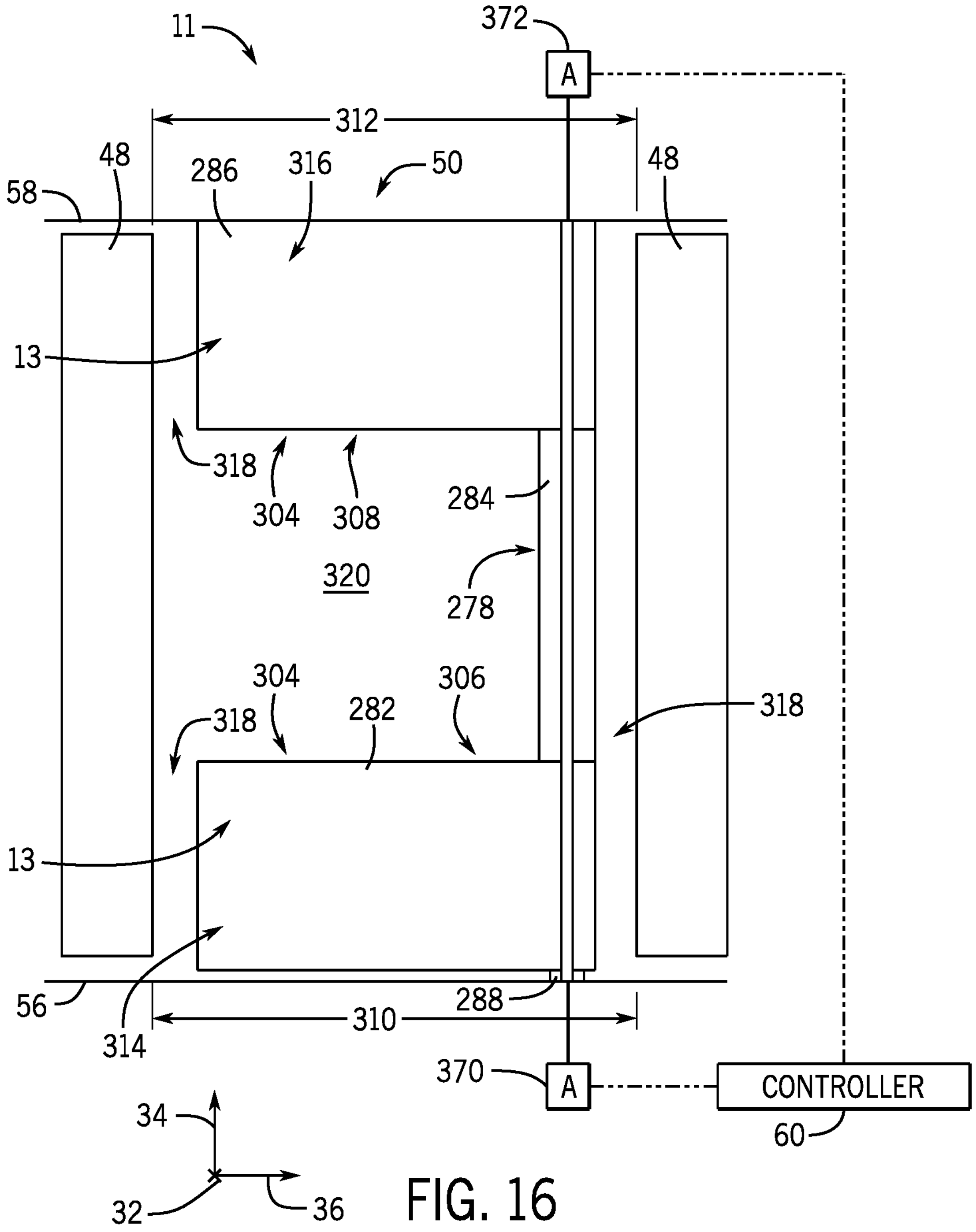
FIG. 16 is a front view of an embodiment of an auxiliary strut between adjacent struts taken within line 16-16 of FIG. 13, further illustrating the central portion of the auxiliary strut in axially alignment with the central axis and the inner and outer portions (e.g., flow control vanes) of the auxiliary strut in the extended positions as shown in FIG. 15.

FIG. 16 is a front view of an embodiment of an auxiliary strut 50 between adjacent struts 48 taken within line 16-16 of FIG. 13, further illustrating the central portion 284 of the auxiliary strut 50 axially aligned with the longitudinal axis 32 and the central engine axis 280 and the inner portion 282 and the outer portion 286 of the auxiliary strut 50 in extended positions 304 as shown in FIG. 15. In the illustrated embodiment, the recirculation blockage system 11 includes an inner actuation assembly 370 (e.g., actuator 70) configured to actuate the inner portion 282 to rotate about one of the one or more strut pivots 288. Additionally, the recirculation blockage system 11 includes an outer actuation assembly 372 (e.g., actuator 70) configured to actuate the outer portion 286 to rotate about one of the one or more strut pivots 288. In the illustrated embodiment, the inner actuation assembly 370 and the outer actuation assembly 372 are shown as being coupled to the same strut pivot 288 of the one or more strut pivots 288. In certain embodiments, the inner actuation assembly 370 may be directly coupled to the inner portion 282. Additionally, or alternatively, the outer actuation assembly 372 may be directly coupled to the outer portion 286.

In the illustrated embodiment, the controller 60 is configured to instruct the inner actuating assembly 370 to cause the inner portion 282 to rotate about the one or more pivots 288 based on one or more operating conditions of the turbine system 10 as discussed above. For example, the controller 60 may be configured to instruct the inner actuating assembly 370 to cause the inner portion 282 to rotate about the one or more pivots 288 based on a low flow condition and/or a reversed flow condition of the exhaust gas. Additionally, the controller 60 is configured to instruct the outer actuating assembly 372 to cause the outer portion 286 to rotate about the one or more pivots 288 based on one or more operating conditions of the turbine system 10. For example, the controller 60 may be configured to instruct the outer actuating assembly 372 to cause the outer portion 286 to rotate about the one or more pivots 288 based on a low flow condition and/or a reversed flow condition of the exhaust gas. In certain embodiments, the inner actuating assembly 370, the outer actuating assembly 372, or both may be actively actuated, passively actuated (e.g., pressure or velocity actuated against a spring force), or both.

In the illustrated embodiment, the inner portion 282 is configured to substantially span (e.g., substantially block) the inner circumferential distance 310 between the adjacent struts 48 while in an extended position 306. Additionally, or alternatively, the outer portion 286 is configured to substantially span (e.g., substantially block) the outer circumferential distance 312 between the adjacent struts 48 while in the extended position 308. That is, the inner portion 282 is configured at least substantially block (e.g., mostly block) the inner section 314 of the exhaust flow path disposed directly radially outward from the inner exhaust wall 56, and the outer portion 286 is configured to at least substantially block (e.g., mostly block) an outer section 316 of the exhaust flow path 90 disposed directly radially inward from the outer exhaust wall 58.

In certain embodiments, gaps 318 may be disposed on either circumferential side of the inner portion 282 or the outer portion 286. In the illustrated embodiment, the inner portion 282 and the outer portion 286 are configured to form the axial opening 320 radially disposed between the inner portion 282 and the outer portion 286 through which the exhaust flow path 90 may flow. In the illustrated embodiment, the inner portion 282 and the outer portion 286 are shown as being circumferentially straight. In certain embodiments, the inner portion 282 and the outer portion 286 may be substantially curved along the circumferential direction 36.

The auxiliary struts 50, when the inner portion 282 and outer portion 286 are in the extended positions 306 and 308, help to compartmentalize the hub vortex and/or the torus vortex as described in detail above. For example, the inner portions 282 of the auxiliary struts 50 in the extended positions 306 may function substantially the same as described in detail above with reference to the inner flow control vanes 92, while the outer portions 286 of the auxiliary struts 50 in the extended positions 308 may function substantially the same as described in detail above with reference to the outer flow control vanes 94, 95. By further example, the inner portions 282 of the auxiliary struts 50 in the extended positions 306 are configured to separate a reversed flow into the downstream hub vortex 114 (e.g., having a low tangential velocity) and the upstream hub vortex 112 (having a high tangential velocity) as discussed above with reference to FIG. 3. The auxiliary struts 50 may be employed separately or in combination with the flow control vanes 13, such as the inner flow control vanes 92, 132 (e.g., inner dam) and the outer flow control vanes 94, 95 (e.g., outer dam) described herein.

Figure 17:
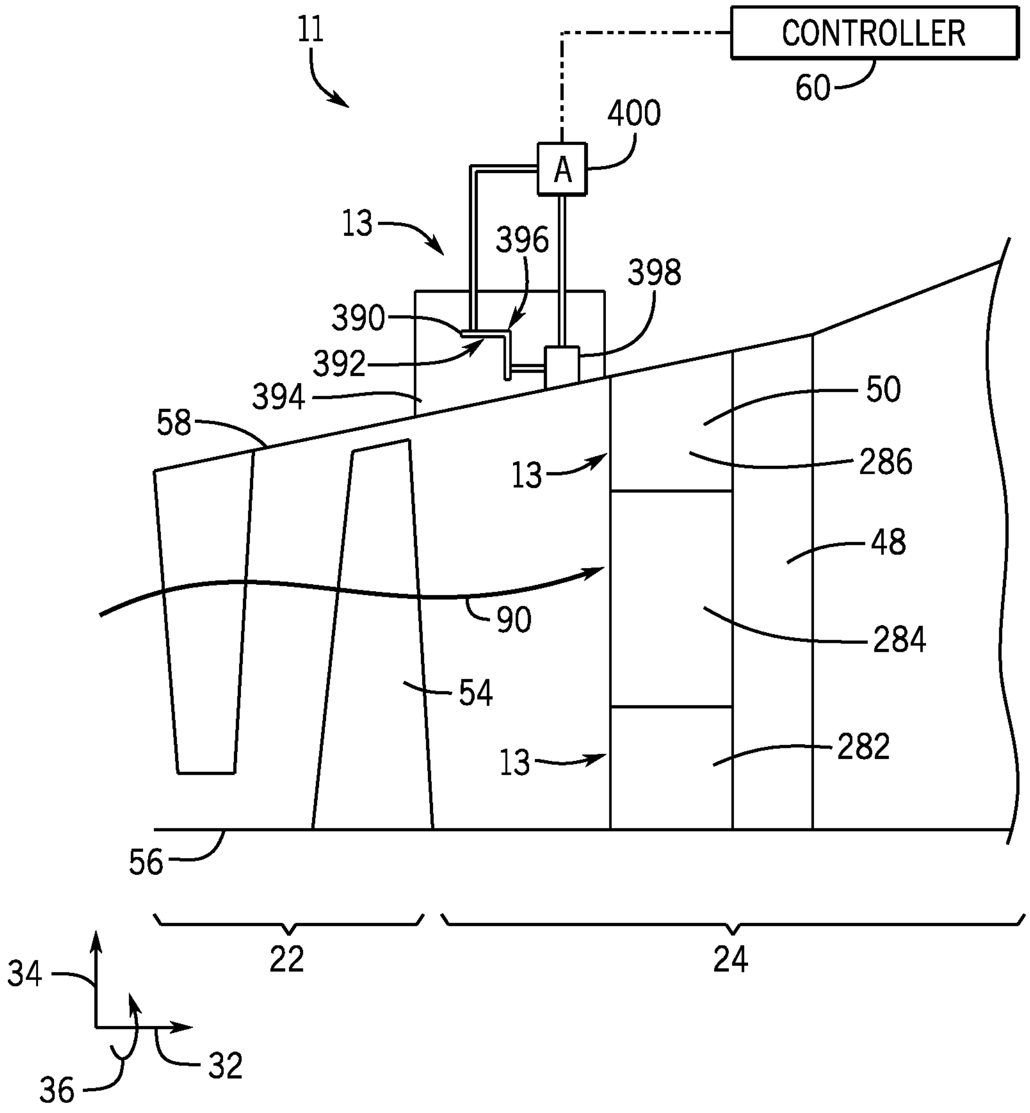
FIG. 17 is a cutaway schematic view of an embodiment of the recirculation blockage system of FIG. 2 showing a flow redirection vane in a retracted position in a recess of the outer exhaust wall of the exhaust section.

FIG. 17 is a cutaway schematic view of an embodiment of the recirculation blockage system 11 of FIG. 2 showing a flow redirection vane 390 (e.g., flow control vane 13) in a retracted position 392 in a recess 394 of the outer exhaust wall 58 of the recirculation blockage system 11. In the illustrated embodiment, the recirculation blockage system 11 includes the exhaust section 24. The exhaust section 24 includes the inner exhaust wall 56 (e.g., inner diameter wall) defining the radially inner boundary of the exhaust flow path 90 and the outer exhaust wall 58 defining the radially outer boundary of the exhaust flow path 90 radially outward from the inner exhaust wall 56. The exhaust section 24 also includes the flow redirection vane 390 disposed downstream of the last stage blades 54 of the turbine section 22 (e.g., last turbine stage 74) and upstream of the struts 48 and/or the auxiliary struts 50 of the exhaust section 24. The flow redirection vane 390 includes a narrow end 396 and a wide end 402 as discussed further herein.

In the illustrated embodiment, the recirculation blockage system 11 includes a flow redirection pivot 398 (e.g., pivot joint, rotational joint, or hinge) coupled to the narrow end 396 of the flow redirection vane 390. Additionally, the exhaust section 24 includes one or more flow redirection actuators 400 (e.g., actuator 70) configured to cause a radial movement of the flow redirection vane 390 in the radial direction 34 of the exhaust section 24, cause a rotational movement of the wide end 402 of the flow redirection vane 390 relative to the narrow end 396, or both. Although the illustrated embodiment shows the one or more flow redirection actuators 400 as being coupled to the flow redirection pivot 398, in certain embodiments, the one or more flow redirection actuators 400 may be coupled to one or more different portions of the flow redirection vane 390.

Figure 18:
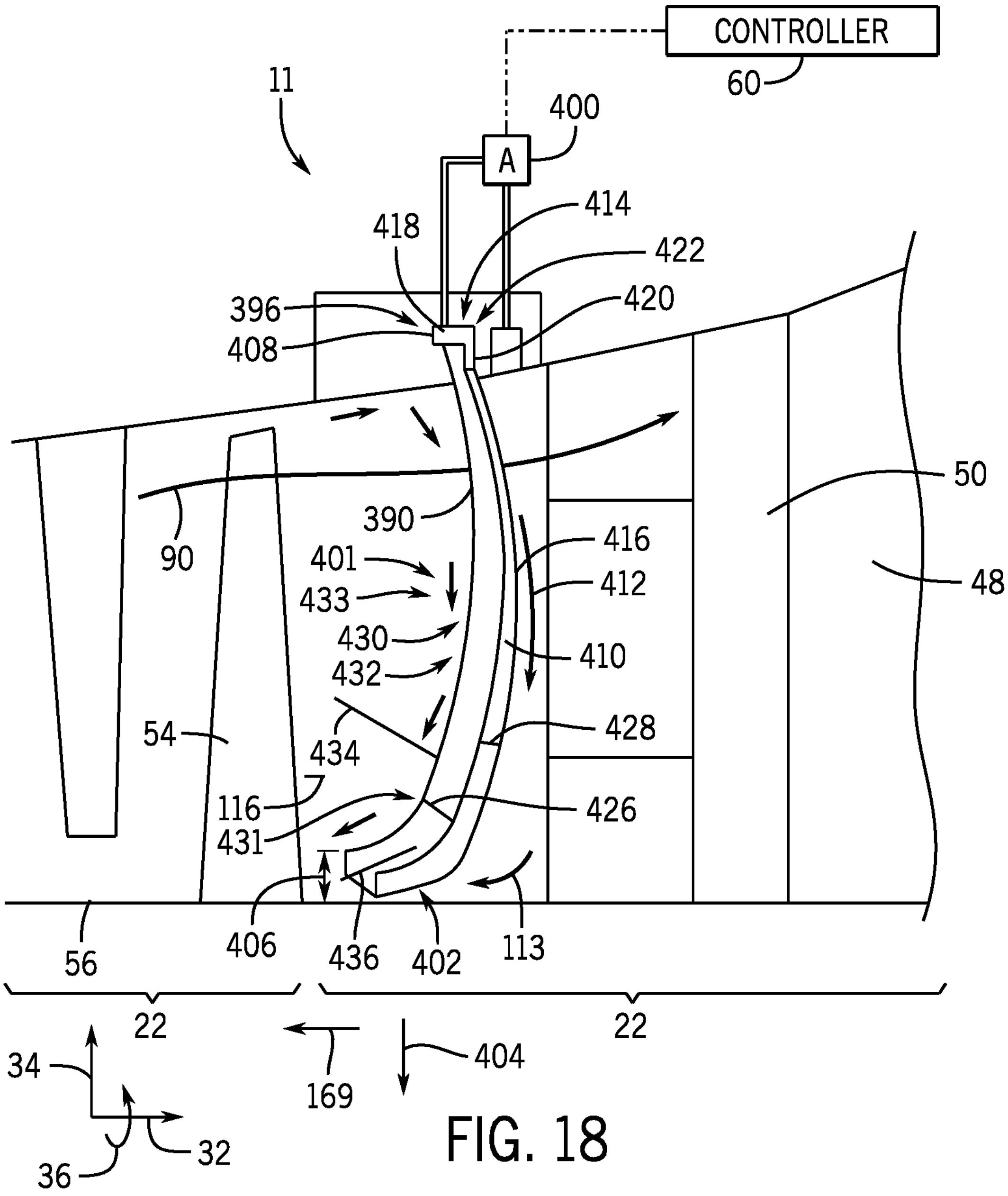
FIG. 18 is a cutaway schematic view of an embodiment of the recirculation blockage system of FIGS. 2 and 17 showing a flow redirection vane extending into the exhaust section in an extended position from the outer exhaust wall to the inner exhaust wall.

FIG. 18 is a cutaway schematic view of an embodiment of the recirculation blockage system 11 of FIGS. 2 and 17 showing the flow redirection vane 390 extending into the exhaust section 24 in an extended position 401. In the illustrated embodiment, the narrow end 396 is disposed at the outer exhaust wall 58 and the wide end 402 is circumferentially 36 offset and axially 32 offset from the narrow end 396. Additionally, the wide end 402 is disposed radially 34 inward in the radial direction 404 from the narrow end 396. In the illustrated embodiment, the wide end 402 contacts the inner exhaust wall 56 when the flow redirection vane 390 is in the extended position 401. In certain embodiments, the wide end 402 is disposed substantially near but radially offset from the inner exhaust wall 56. In the illustrated embodiment, the wide end 402 is shown as being disposed in an upstream direction 169 of the exhaust section 24 relative to the narrow end 396. In certain embodiments, the wide end 402 may be disposed downstream of the narrow end 396 or axially aligned with the narrow end 396.

In the illustrated embodiment, a radial extent 406 (e.g., radial width) of the wide end 402 is larger than a radial extent 408 of the narrow end 396. Additionally, the radial extent 406 of the wide end 402 is disposed radially inward of the radial extent 408 of the narrow end 396. As shown, the flow redirection vane 390 includes a curved wall 410 (e.g., lofted wall) extending from the narrow end 396 to the wide end 402. In certain embodiments, the curved wall 410 includes a loft 412 (e.g., substantial loft) of a cross-section 414 along a curve 416 from the narrow end 396 to the wide end 402. That is, the cross-section 414 is swept along the curve 416 from the narrow end 396 to the wide end 402 to form the curved wall 410. As shown, the cross-section 414 (e.g., cross-section shape) includes a radial portion 418 extending in a substantial radially inward direction 404 and an axial portion 420 extending crosswise (e.g., perpendicular, orthogonal) from an outer radial edge 422 of the radial portion 418. As shown, the axial portion 420 extends in a substantial upstream direction 169 of the exhaust section 24. Additionally, one or more dimensions of the cross-section 414 may vary from the narrow end 396 to the wide end 402. In the illustrated embodiment, an extent 426 (e.g., radial extent) of the radial portion 418 increases from the narrow end 396 to the wide end 402. In certain embodiments, an extent 428 of the axial portion 420 may vary (e.g., increase) from the narrow end 396 to the wide end 402.

In the illustrated embodiment, the curve 416 includes a first curve portion 430 extending from the narrow end 396 (e.g., first end) in a downstream direction of the exhaust section 24, and a second curve portion 431 extending from the first curve portion 430 in an upstream direction of the exhaust section 24. As shown, a first concave side 432 of the first curve portion 430 and a second concave side 433 are directed in (e.g., faces) the upstream direction 169 of the exhaust section 24. As shown, a radius of curvature 434 of the curve 416 increases from the narrow end 396 to the wide end 402. That is, the curve 416 becomes more curved from the narrow end 396 to the wide end 402. In the illustrated embodiment, a tangent 436 (e.g., tangent line) of the curve 416 is acutely angled clockwise relative to the radially inward direction 404 and directed in the upstream direction 169. In certain embodiments, the tangent 436 may be directed in the radial direction 404.

The flow redirection vane 390 is configured to capture, redirect, and mix a portion of the exhaust flow path 90 that has high tangential velocity (e.g., free stream flow) from the outer exhaust wall 58 with the reversed flow 113 of the exhaust flow path 90 along the inner exhaust wall 56, thereby increasing the tangential velocity of the reversed flow 113 and reducing the velocity gradient of the shear layer 116 after the last stage blades 54 of the turbine section 22 (e.g., last turbine stage 74). In certain embodiments, the flow redirection vane 390 may be employed separately or in combination with the flow control vanes 13 associated with the auxiliary strut 50 and/or the flow control vanes 13 (e.g., the inner flow control vanes 92, 132 and/or the outer flow control vanes 94, 95) described herein.

Figure 19:
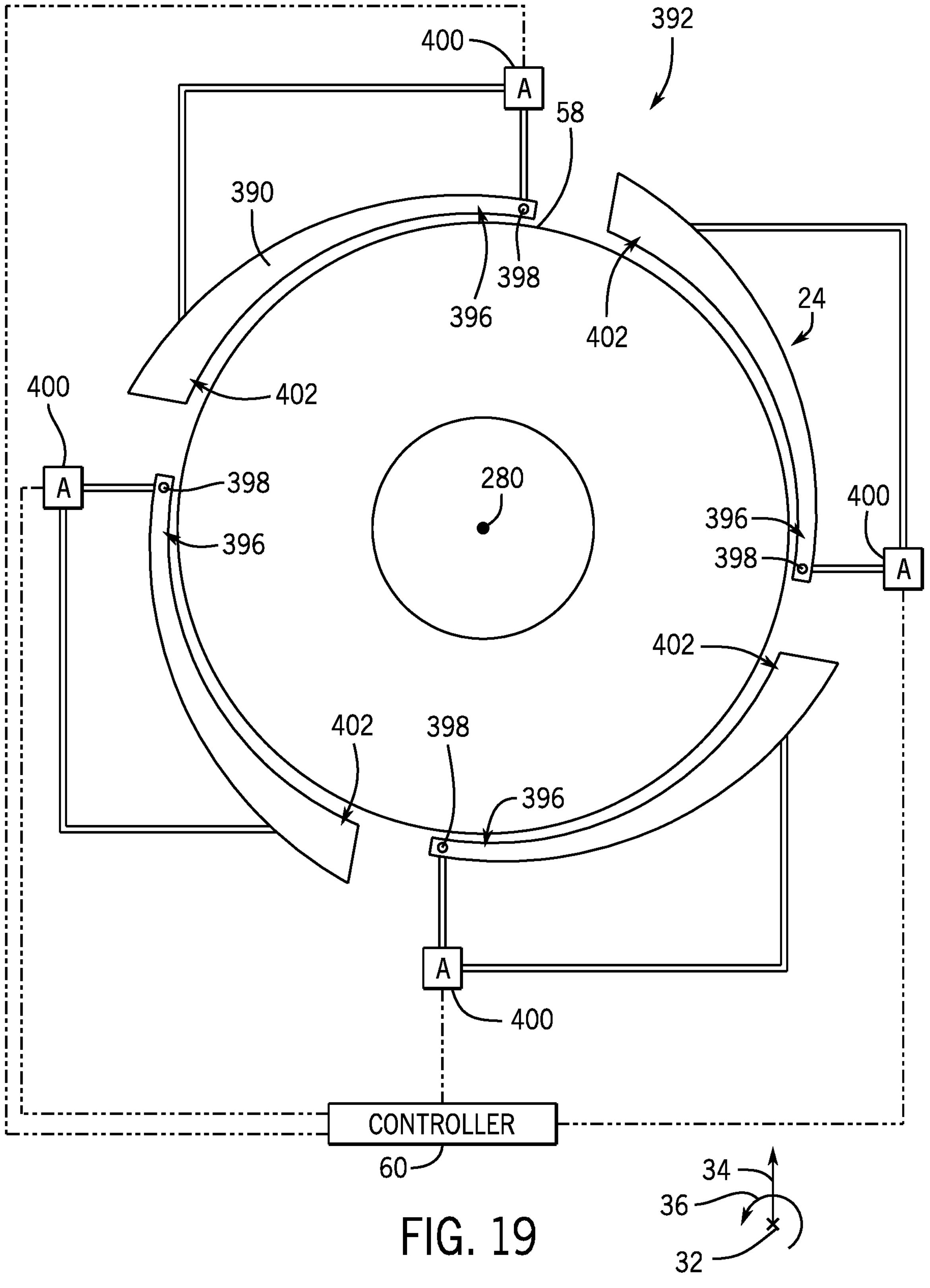
FIG. 19 is a cross-sectional schematic view of an embodiment of a set of the flow redirection vanes of FIGS. 17 and 18, taken along the radial axis in the retracted position of FIG. 17.

FIG. 19 is a cross-sectional schematic view of an embodiment of a set of the flow redirection vanes 390 of FIGS. 17 and 18, taken along the radial axis 34 in the retracted position 392 of FIG. 17. In the illustrated embodiment, each flow redirection vane 390 is disposed radially outward of the outer exhaust wall 58 while in the retracted position 392. In certain embodiments, the flow redirection vanes 390 may be coupled to the inner exhaust wall 56 and may retract radially inward of the inner exhaust wall 56 while in the retracted position 392. That is, in certain embodiments, the flow redirection vanes 390 may retract into a recess disposed in the inner exhaust wall 56. Regardless of mounting location (i.e., inner exhaust wall 56 or outer exhaust wall 58), the flow redirection vanes 390 are configured to circumferentially curve about the central engine axis 280 of the exhaust section 24 while in the retracted position 392.

In the illustrated embodiment, a redirection actuator 400 is coupled to each flow redirection vane 390. As shown, the redirection actuators 400 are coupled to the redirection pivot 398 and to the flow redirection vane 390. In certain embodiments, the redirection actuator 400 is coupled to either the redirection pivot 398 or the flow redirection vane 390. In the illustrated embodiment, each flow redirection vane 390 is actuated via a separate redirection actuator 400. In certain embodiments, the redirection actuator 400 may be configured to actuate more than one flow redirection vane 390 (e.g., two flow redirection vanes, three flow redirection vanes, etc.). In certain embodiments, the flow redirection vanes 390 may be actuated via a single redirection actuator 400. As shown, the controller 60 is communicatively coupled to each individual redirection actuator 400. In certain embodiments, one or more redirection actuators 400 may be daisy-chained together and/or the controller 60 may be communicatively coupled to a subset of the redirection actuators 400.

In the illustrated embodiment, the exhaust section 24 includes 4 flow redirection vanes 390. In certain embodiments, the exhaust section 24 may include two or more flow redirection vanes 390 (e.g., 2, 3, 4, 5, 6, 7, 8, 9, 10, or more). In the illustrated embodiment, the wide end 402 of each flow redirection vane 390 is disposed circumferentially counterclockwise (e.g., in the circumferential direction 36) relative to the narrow end 396. In certain embodiments (not shown), the wide end 402 of each flow redirection vane 390 is disposed circumferentially clockwise relative to the narrow end 396.

Figure 20:
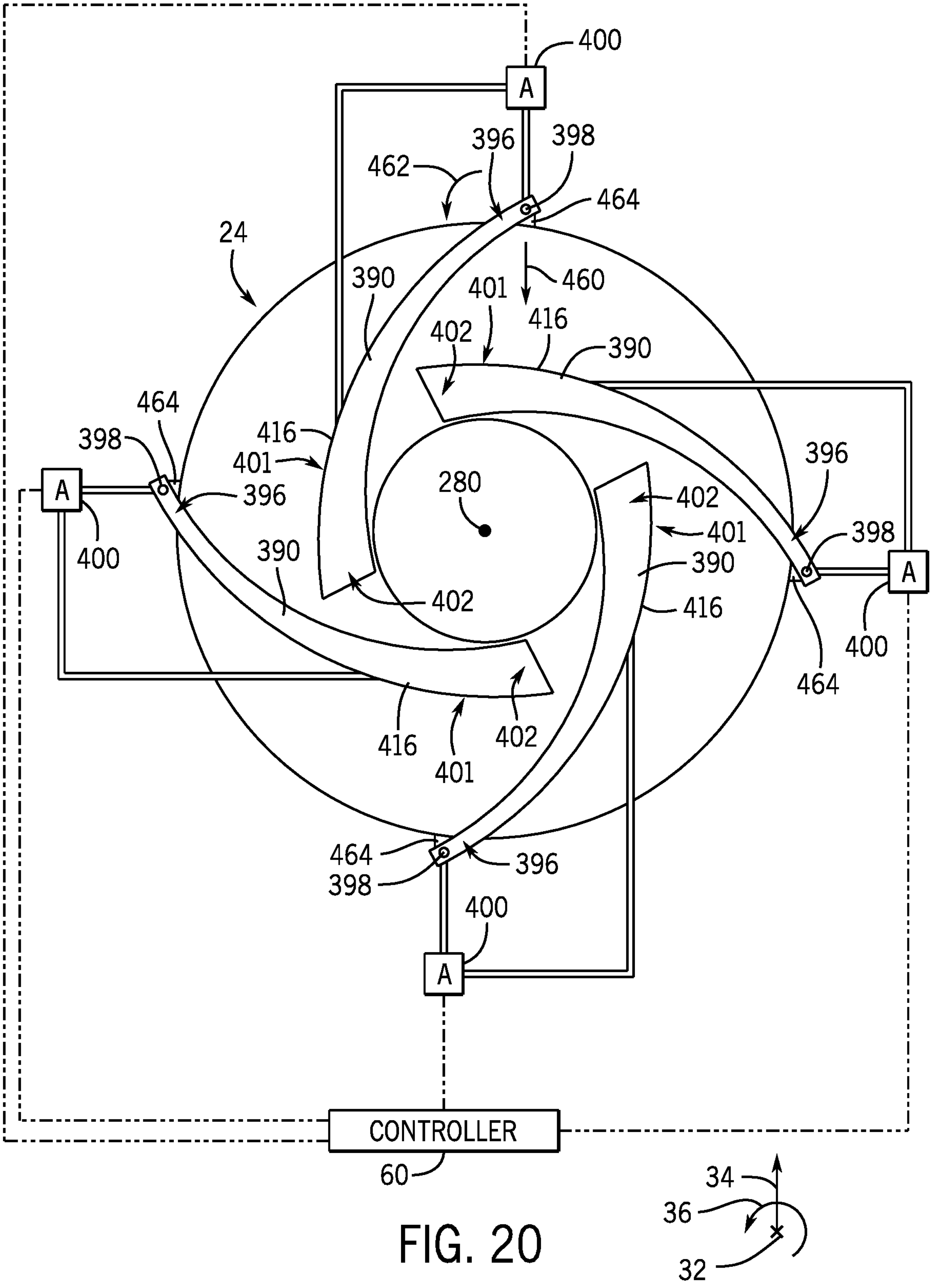
FIG. 20 is a cross-sectional schematic view of an embodiment of the set of the flow redirection vanes of FIGS. 17 and 18, taken along the radial axis in the extended position of FIG. 18.

FIG. 20 is a cross-sectional schematic view of an embodiment of the flow redirection vane 390 of FIGS. 17-19, taken along the radial axis 34 in the extended position 401 of FIG. 18. In the illustrated embodiment, the curved wall 416 (e.g., lofted wall) of the flow redirection vane 390 is configured to circumferentially curve about the central engine axis 280 of the exhaust section 24. As shown, the curved wall 416 curves radially inward from the narrow end 396 to the wide end 402 when the flow redirection vane 390 is in the extended position 401 (e.g., extended state).

The flow redirection vanes 390 are configured to selectively extend into (e.g., selectively engage) the exhaust flow path 90 of the exhaust section 24 via the redirection actuators 400 (e.g., actuators 70). In certain embodiments, the redirection actuator 400 may be configured to cause a translation 460 of the flow redirection vane 390 in the radial direction 34 of the exhaust section 24. Additionally, or alternatively, the redirection actuator 400 may be configured to cause a rotation 462 of the wide end 402 about the narrow end 396. That is, the redirection actuator 400 may be configured to rotate the flow redirection vane 390 about the redirection pivot 398. In certain embodiments, the translation 460 may precede the rotation 462, while in other embodiments the rotation 462 may precede the translation 460.

In certain embodiments, the redirection pivot 398 may contribute to both the translation 460 and the rotation 462 of the flow redirection vane 390. For example, the redirection pivot 398 may be configured to translate (e.g., slide) in a slot 464. The redirection actuator 400 may be configured to cause the translation 460 of the flow redirection vane 390 via translating the flow redirection vane 390 through the slot 464. It should be understood that the translation 460 and the rotation 462 of the flow redirection vane 390 may be performed by the same redirection actuator 400 or different redirection actuators 400.

Figure 21:
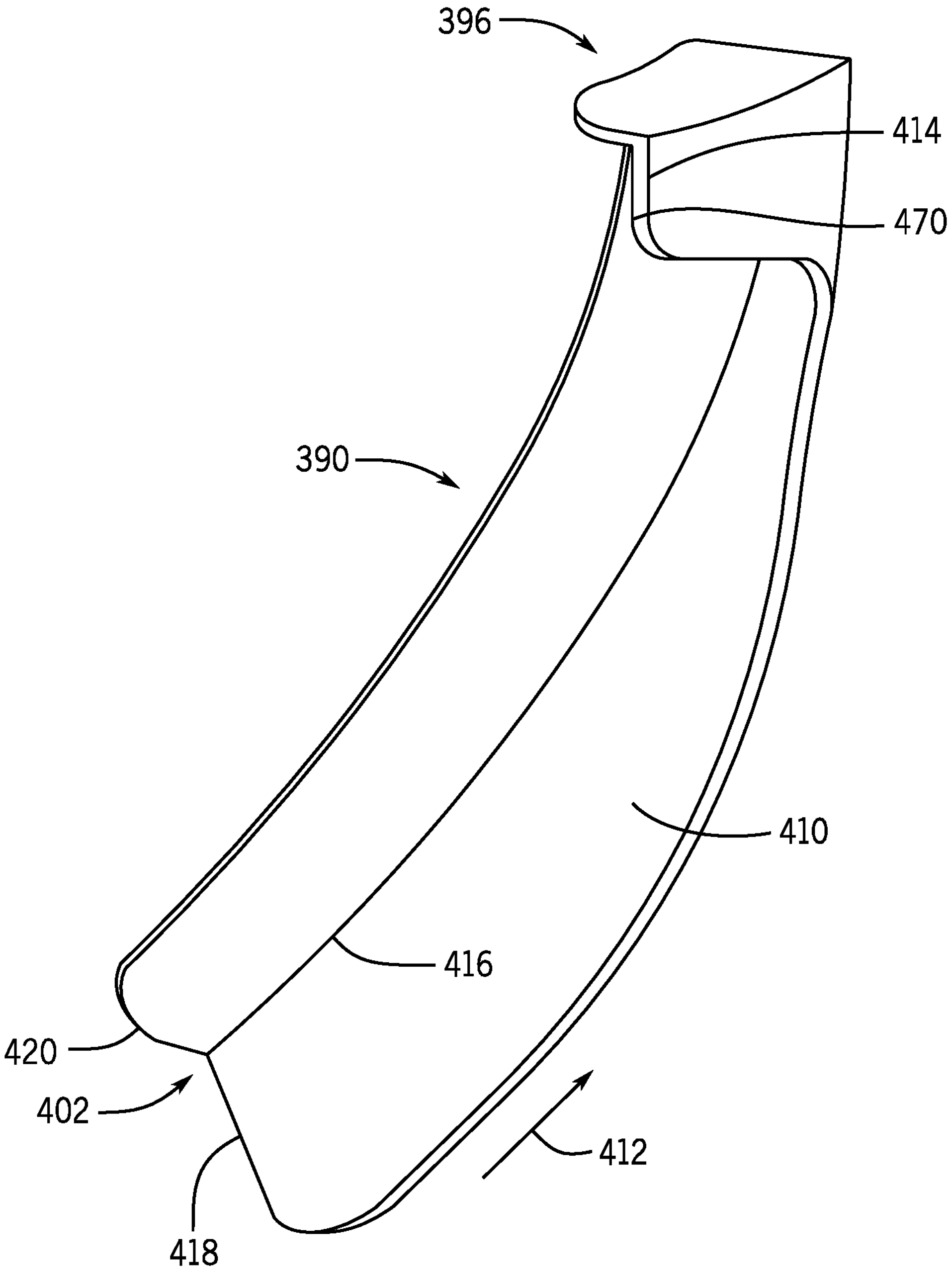
FIG. 21 is a perspective view of an embodiment of the flow redirection vane of FIGS. 17-20.

FIG. 21 is a perspective view of an embodiment of the flow redirection vane 390 of FIGS. 17-20. In the illustrated embodiment, the flow redirection vane 390 includes a unitary body (i.e., one piece) extending from the narrow end 396 to the wide end 402. In certain embodiments, the flow redirection vane 390 may be composed of a metal (e.g., aluminum, steel) or a durable composite (e.g., carbon fiber-reinforced polymer). As shown previously, the redirection pivot 398 is disposed on the narrow end 396 of the flow redirection vane 390.

In the illustrated embodiment, the flow redirection vane 390 includes the curved wall 410 (e.g., lofted wall) extending from the narrow end 396 to the wide end 402. In certain embodiments, the curved wall 410 includes the loft 412 (e.g., substantial loft) of the cross-section 414 along the curve 416 from the narrow end 396 to the wide end 402. That is, the cross-section 414 is swept along the curve 416 from the narrow end 396 to the wide end 402 to form the curved wall 410. As shown, the cross-section 414 (e.g., cross-section shape, contour) includes an L-shape contour 470. In the illustrated embodiment, the L-shape contour 470 includes the radial portion 418 and the axial portion 420 extending crosswise (e.g., perpendicular, orthogonal) from an outer radial edge 422 (FIG. 18) of the radial portion 418. Additionally, one or more dimensions of the cross-section 414 may vary from the narrow end 396 to the wide end 402. In the illustrated embodiment, an extent 426 (e.g., radial extent) of the radial portion 418 increases from the narrow end 396 to the wide end 402.

Figure 22:
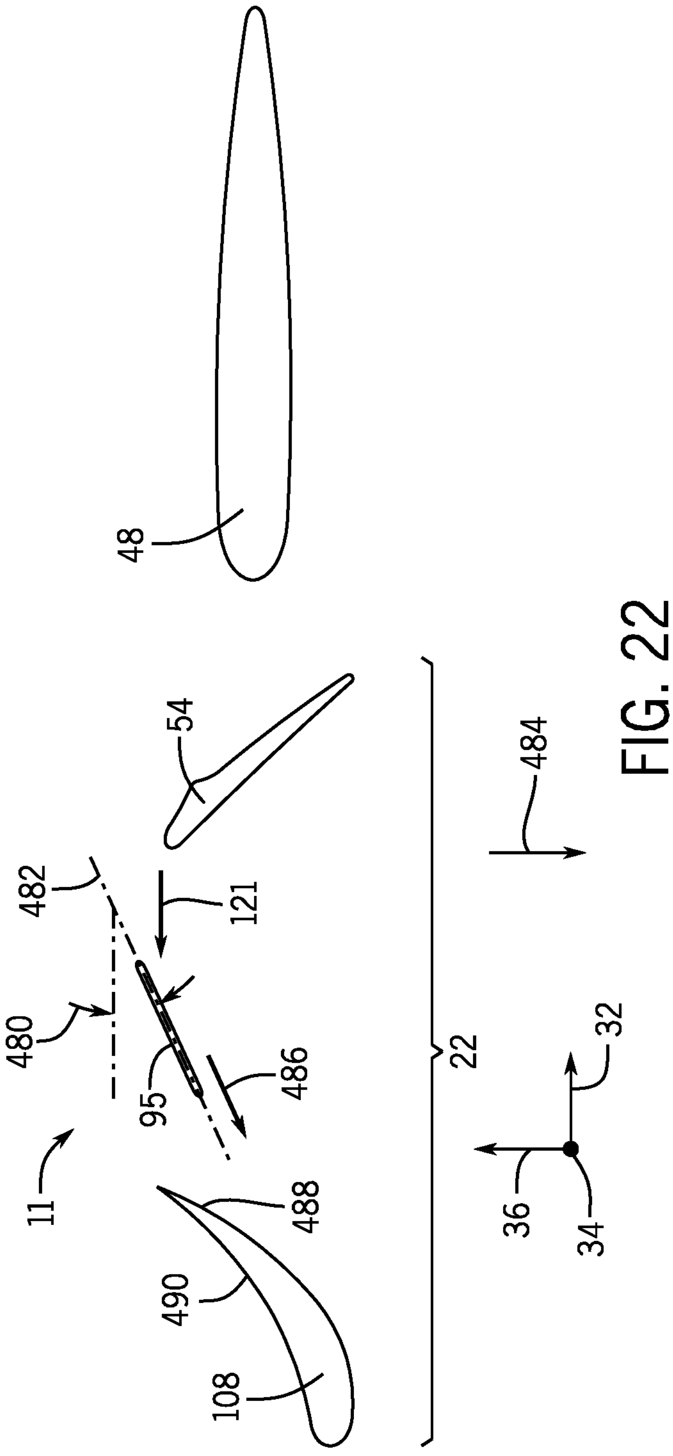
FIG. 22 is a cross-sectional schematic view of an embodiment of the recirculation blockage system of FIG. 2, taken along line 22-22 of FIG. 3.

FIG. 22 is a cross-sectional schematic view of an embodiment of the recirculation blockage system 11 of FIG. 2, taken along line 22-22 of FIG. 3. In the illustrated embodiment, the cutting plane of the cross-section is orthogonal to the radial direction 34 and intersects the last stage vane 108, the outer flow control vane 95, the last stage blade 54, and the strut 48. As shown, the outer flow control vane 95 is disposed downstream of the last stage vane 108 and upstream of the last stage blade 54. The outer flow control vane 95 is disposed on an outer turbine wall of the turbine section 22 within the last turbine stage 74. In certain embodiments, an angle 480 formed by a central axis 482 of the outer flow control vane 95 and the longitudinal axis 32 is a positive acute angle. The angle 480 of the outer flow control vane 95 relative to the longitudinal axis 32 deflects the reverse flow 121 in the circumferential direction 484 (e.g., opposite of the blade rotation direction), such that the direction of the deflected reverse flow 486 more closely aligns with a trailing portion 488 of the last stage vane 108. The deflection of the reverse flow 121 may enable the deflected reverse flow 486 to more closely align with the outer contour 490 of the last stage vane 108, thereby mitigating turbulence that may otherwise result from the reverse flow 121 (e.g., undeflected) contacting the last stage vane 108.

As discussed herein, the outer flow control vane 95 may mitigate the formation of a torus vortex between the last stage vane 108 and the last stage blade 54. In certain embodiments, any number of outer flow control vanes 95 may be disposed between the last stage vane 108 and the last stage blade 54. For example, 2, 3, 4, 5, 6, 7, 8, 9, 10, 15, 20, 30, 50, 100, or more flow control vanes 95 (e.g., circumferentially spaced about the longitudinal axis 32) may be disposed between the last stage vane 108 and the last stage blade 54. As with the inner flow control vanes, the outer flow control vanes 95 may be axially aligned (e.g., common axial position) in the turbine section 22 to form an outer dam (e.g., outer annular dam). In certain embodiments, the outer flow control vanes 95 may be disposed between the second-to-last stage blade and the last stage vane 108, the second-to-last stage vane and the second-to-last stage blade, or between any adjacent sets of blades and vanes of the turbine section 22.

As shown in FIG. 3, the turbine section 22 may also include one or more inner flow control vanes 132 disposed on the inner turbine wall 78 between the last stage vane 108 and the last stage blade 54 of the turbine 22, extending radially outward from the inner turbine wall 78 of the turbine section 22. In certain embodiments, the one or more inner flow control vanes 132 and the outer flow control vanes 95 may be disposed at a common axial position along the longitudinal axis 32. As described in FIG. 4, the outer flow control vanes 95 may be configured to extend radially inward from a recess (e.g., 150) disposed in the outer turbine wall 76. Additionally, or alternatively, the inner flow control vanes 132 may be configured to extend radially outward from a recess (e.g., 150) disposed in the inner turbine wall 78. The actuation configurations described in FIG. 4 (e.g., linear extension, rotation about pivot, etc.) may apply to the outer flow control vanes 95 and/or the inner flow control vanes 132 disposed in the turbine section 22.

Technical effects of the disclosed embodiments include the ability to mitigate the formation of rotating stall cells in an exhaust section of a gas turbine engine. In particular, the disclosed embodiments reduce the velocity gradient of a shear layer disposed immediately after the last stage blades of the turbine section. For example, in one embodiment, an inner dam (e.g., including a plurality of inner flow control vanes) disposed on the inner exhaust wall causes the compartmentalization of an upstream vortex and a downstream vortex of the reverse flow of exhaust gas. The upstream vortex retains a high tangential velocity adjacent the last stage blades, thereby reducing the velocity gradient of the shear layer. In certain embodiments, auxiliary struts disposed between adjacent main struts may include an inner portion, a central portion, and an outer portion. The inner and outer portions (e.g., flow control vanes) may be configured to rotate to circumferentially angled positions, thereby deflecting a greater proportion of the free stream flow to the reversed flow, thereby increasing the tangential velocity of the reversed flow and reducing the shear layer velocity gradient adjacent the last stage blades. In certain embodiments, the flow redirection vane is used to transfer a portion of the exhaust flow from near the outer exhaust wall having a high tangential velocity to the reverse flow near the inner exhaust wall. By adding high velocity flow to the reverse flow, the overall tangential velocity of the reverse flow is increased adjacent the last stage blades, thereby reducing the velocity gradient of the shear layer. In certain embodiments, one or more outer flow control vanes and/or inner flow control vanes may be disposed downstream of a last stage vane and upstream of a last stage blade of the turbine. The outer flow control vanes may be disposed on an outer turbine wall and may be configured to mitigate the formation of a torus vortex between the last stage vane and the last stage blade.

The subject matter described in detail above may be defined by one or more clauses, as set forth below.

According to a first aspect, a system includes a turbine exhaust section having an exhaust flow path, an inner exhaust wall radially disposed along the exhaust flow path, an outer exhaust wall disposed radially outward of the inner exhaust wall and along the exhaust flow path, and a flow control vane extending between a first end and a second end. The first and second ends are circumferentially offset from one another. The flow control vane is configured to move between a retracted position along the outer exhaust wall and an extended position extending from the outer exhaust wall toward the inner exhaust wall. The second end is disposed radially inward from the first end while the flow control vane is disposed in the extended position.

The system of the preceding clause, wherein the flow control vane is disposed downstream of a last stage blade of the turbine exhaust section and upstream of a diffuser strut of the turbine exhaust section.

The system of any preceding clause, wherein a first radial extent of the first end and a second radial extent of the second end are different from one another.

The system of any preceding clause, wherein the flow control vane includes a curved wall, wherein the curved wall includes a substantial loft of a cross-section along a curve from the first end to the second end.

The system of any preceding clause, wherein the cross-section includes a radial portion extending in a substantial radial direction of the turbine exhaust section. The cross-section also includes an axial portion extending crosswise from an outer radial edge of the radial portion. The axial portion extends in a substantial upstream direction of the turbine exhaust section.

The system of any preceding clause, wherein a radial extent of the radial portion increases from the first end to the second end.

The system of any preceding clause, wherein the flow control vane is configured to circumferentially curve about a central longitudinal axis of the turbine exhaust section.

The system of any preceding clause, wherein the curved wall includes a first curve portion extending from the first end in a downstream direction of the turbine exhaust section. The curved wall also includes a second curve portion extending from the first curve portion in an upstream direction of the turbine exhaust section.

The system of any preceding clause, wherein a first concave side of the first curve portion and a second concave side of the second curve portion face the upstream direction.

The system of any preceding clause, wherein a radius of curvature of the curved wall increases from the first end to the second end along a length of the curved wall.

The system of any preceding clause, wherein a tangent of the curved wall at the second end is directed in a radial direction of the turbine exhaust section or in a direction angled upstream from the radial direction when the flow control vane is in the extended position.

According to a second aspect, a system includes a turbine exhaust section having an exhaust flow path, an inner exhaust wall radially disposed along the exhaust flow path, an outer exhaust wall radially disposed along the exhaust flow path radially outward of the inner exhaust wall, and a flow control vane extending between a first end and a second end. The first and second ends are circumferentially offset from one another. The flow control vane is configured to move between a retracted position and an extended position. The flow control vane is disposed along one of the inner and outer exhaust walls in the retracted position. The flow control vane extends between the outer exhaust wall and the inner exhaust wall in the extended position. The flow control vane extends radially between the first and second ends in the extended position.

The system of the preceding clause, wherein the flow control vane is configured to curve radially inward from the first end to the second end when the flow control vane is in the extended position.

The system of any preceding clause, wherein the turbine exhaust section includes one or more actuators configured to cause a translation of the flow control vane in a radial direction of the turbine exhaust section, cause a rotation of the second end relative to the first end, or both.

The system of any preceding clause, wherein the flow control vane is disposed downstream of a last stage blade of the system and upstream of a strut of the turbine exhaust section.

The system of any preceding clause, wherein a first radial extent of the first end and a second radial extent of the second end are different from one another.

According to a third aspect, a system includes a turbine exhaust section having an exhaust flow path, an inner exhaust wall radially disposed along the exhaust flow path, an outer exhaust wall radially disposed along the exhaust flow path radially outward of the inner exhaust wall, and a flow control vane extending between a first end and a second end. The first and second ends are circumferentially offset from one another. The flow control vane is configured to move between a retracted position and an extended position. The flow control vane is disposed along one of the inner and outer exhaust walls in the retracted position. The flow control vane extends between the outer exhaust wall and the inner exhaust wall in the extended position. The flow control vane extends radially between the first and second ends in the extended position. The flow control vane has a variable width between the first and second ends.

The system of the preceding clause, wherein a first radial extent of the first end and a second radial extent of the second end are different from one another.

The system of any preceding clause, wherein the flow control vane includes a curved wall, wherein the curved wall includes a loft along a curve from the first end to the second end.

The system of any preceding clause, wherein the loft includes an L-shaped contour. The L-shaped contour includes a radial portion extending in a substantial radial direction of the turbine exhaust section. The L-shaped contour also includes an axial portion extending crosswise from an outer radial edge of the radial portion. The axial portion extends in a substantial upstream direction of the turbine exhaust section.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine exhaust section comprising:
- an exhaust flow path;
- an inner exhaust wall radially disposed along the exhaust flow path;
- an outer exhaust wall disposed radially outward of the inner exhaust wall and along the exhaust flow path; and
- a flow control vane extending between a first end and a second end, wherein the first and second ends are circumferentially offset from one another, the flow control vane is configured to move between a retracted position along the outer exhaust wall and an extended position extending from the outer exhaust wall toward the inner exhaust wall, and the second end is disposed radially inward from the first end while the flow control vane is disposed in the extended position.

2. The system of claim 1, wherein the flow control vane is disposed downstream of a last stage blade of the turbine exhaust section and upstream of a diffuser strut of the turbine exhaust section.

3. The system of claim 1, wherein a first radial extent of the first end and a second radial extent of the second end are different from one another.

4. The system of claim 1, wherein the flow control vane comprises a curved wall, wherein the curved wall comprises a cross-section swept along a curve from the first end to the second end.

5. The system of claim 4, wherein the cross-section comprises:

a radial portion extending in a radial direction of the turbine exhaust section; and an axial portion extending crosswise from an outer radial edge of the radial portion;

wherein the axial portion extends in an upstream direction of the turbine exhaust section.

6. The system of claim 5, wherein a radial extent of the radial portion increases from the first end to the second end.

7. The system of claim 4, wherein the flow control vane is configured to circumferentially curve about a central longitudinal axis of the turbine exhaust section.

8. The system of claim 4, wherein the curved wall comprises:

a first curve portion extending from the first end in a downstream direction of the turbine exhaust section; and a second curve portion extending from the first curve portion in an upstream direction of the turbine exhaust section.

9. The system of claim 8, wherein a first concave side of the first curve portion and a second concave side of the second curve portion face the upstream direction.

10. The system of claim 8, wherein a radius of curvature of the curved wall increases from the first end to the second end along a length of the curved wall.

11. The system of claim 10, wherein a tangent of the curved wall at the second end is directed in a radial direction of the turbine exhaust section or in a direction angled upstream from the radial direction when the flow control vane is in the extended position.

12. A system, comprising:

a turbine exhaust section comprising:

an exhaust flow path;

an inner exhaust wall radially disposed along the exhaust flow path;

an outer exhaust wall radially disposed along the exhaust flow path radially outward of the inner exhaust wall; and a flow control vane extending between a first end and a second end, wherein the first and second ends are circumferentially offset from one another, the flow control vane is configured to move between a retracted position and an extended position, the flow control vane is disposed along one of the inner and outer exhaust walls in the retracted position, the flow control vane extends between the outer exhaust wall and the inner exhaust wall in the extended position, and the flow control vane extends radially between the first and second ends in the extended position.

13. The system of claim 12, wherein the flow control vane is configured to curve radially inward from the first end to the second end when the flow control vane is in the extended position.

14. The system of claim 13, wherein the turbine exhaust section comprises one or more actuators configured to:

cause a translation of the flow control vane in a radial direction of the turbine exhaust section;

cause a rotation of the second end relative to the first end;

or both.

15. The system of claim 12, wherein the flow control vane is disposed downstream of a last stage blade of the system and upstream of a strut of the turbine exhaust section.

16. The system of claim 12, wherein a first radial extent of the first end and a second radial extent of the second end are different from one another.

17. A system, comprising:

a turbine exhaust section comprising:

an exhaust flow path;

an inner exhaust wall radially disposed along the exhaust flow path;

an outer exhaust wall radially disposed along the exhaust flow path radially outward of the inner exhaust wall; and a flow control vane extending between a first end and a second end, wherein the first and second ends are circumferentially offset from one another, the flow control vane is configured to move between a retracted position and an extended position, the flow control vane is disposed along one of the inner and outer exhaust walls in the retracted position, the flow control vane extends between the outer exhaust wall and the inner exhaust wall in the extended position, and the flow control vane extends radially between the first and second ends in the extended position, and the flow control vane has a variable width between the first and second ends.

18. The system of claim 17, wherein a first radial extent of the first end and a second radial extent of the second end are different from one another.

19. The system of claim 17, wherein the flow control vane comprises a curved wall, wherein the curved wall comprises a cross-section swept along a curve from the first end to the second end.

20. The system of claim 19, wherein the cross-section comprises an L-shaped contour comprising:

a radial portion extending in a radial direction of the turbine exhaust section; and an axial portion extending crosswise from an outer radial edge of the radial portion;

wherein the axial portion extends in an upstream direction of the turbine exhaust section.

* * * * *